(12) United States Patent
Wesselman et al.

(10) Patent No.: US 11,272,048 B1
(45) Date of Patent: Mar. 8, 2022

(54) SYSTEMS AND METHODS FOR MANAGING CONNECTIONS BETWEEN A HEADSET AND MULTIPLE DEVICES

(71) Applicant: Plantronics, Inc., Santa Cruz, CA (US)

(72) Inventors: Tom Wesselman, Austin, TX (US); Kenneth Brown, San Martin, CA (US); Babandeep Singh, Santa Cruz, CA (US); Brian Caldwell, Los Gatos, CA (US); Jonathan Grover, San Jose, CA (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 16/952,591

(22) Filed: Nov. 19, 2020

(51) Int. Cl.
*H04M 1/60* (2006.01)
*H04W 36/02* (2009.01)
*H04W 76/15* (2018.01)

(52) U.S. Cl.
CPC ....... *H04M 1/6066* (2013.01); *H04W 36/026* (2013.01); *H04W 76/15* (2018.02)

(58) Field of Classification Search
CPC . H04M 1/6066; H04W 36/026; H04W 76/15; H04W 4/06; H04W 8/22; H04W 12/08; H04W 12/12; H04W 12/126; H04W 12/35; H04W 4/00; H04W 4/20; H04W 4/50; H04W 4/60; H04W 8/245; H04W 4/80; H04W 92/02; H04W 4/10; H04W 64/006; H04W 8/02

USPC ...................................................... 455/569.1
See application file for complete search history.

(56) References Cited

U.S. PATENT DOCUMENTS

2016/0100042 A1* 4/2016 Pedersen ............. H04M 1/6066
379/420.04

* cited by examiner

*Primary Examiner* — Shaima Q Aminzay
(74) *Attorney, Agent, or Firm* — Slayden Grubert Beard PLLC

(57) ABSTRACT

Systems and methods are provided for managing connections between a wireless headset and various user devices, e.g., to answer or place a call at a particular user device (e.g., a device that is not currently connected to the headset) as a headset-supported call in which the call audio is routed from the particular user device to the headset and/or vice versa. Connections between the headset and relevant user devices may be controlled or facilitated by suitable software and hardware components to establish the headset-supported call. For example, such device connections may be controlled or facilitated by a cloud-based network including remote server(s). As another example, the device connections may be controlled or facilitated by a local mesh network, e.g., including user device(s) connected to the headset and the particular user device. As another example, the device connections may be cooperatively managed by a cloud-based network and a local mesh network.

19 Claims, 25 Drawing Sheets

| Headset State | Call incoming on Device C when Headset is Connected to Device A & Device B |
|---|---|
| Telephony in Use on Device A (302) | ☐ Device A is the Device in use<br>☐ Cloud should only be signaling Device A<br>☐ Device B will ignore any commands from Device A or Cloud to Headset, and Device B will ignore any events from Headset.<br>☐ Device A controls further actions<br>☐ Optimizes user experience for minimal interruption to pre-call on Device C experience |
| Music/Other in Use on Device A (304) | ☐ Device A is the Device in use<br>☐ Cloud should only be signaling Device A<br>☐ Device B will ignore any commands from Device A or Cloud to Headset, and Device B will ignore any events from Headset.<br>☐ Device A controls further actions<br>☐ Optimizes user experience for minimal interruption to pre-call on Device C experience |
| Headset Not in Use, User Wearing (306) | ☐ Cloud makes decision on which connected device to communicate with Headset.<br>☐ Device A control further actions<br>☐ Device B ignores further actions<br>☐ Optimizes user experience for speed |
| Headset Not in Use, User Wearing (308) | ☐ Cloud makes decision on which connected device to communicate with Headset.<br>☐ Device A control further actions<br>☐ Device B ignores further actions<br>☐ Optimizes user experience for speed |

FIG. 3

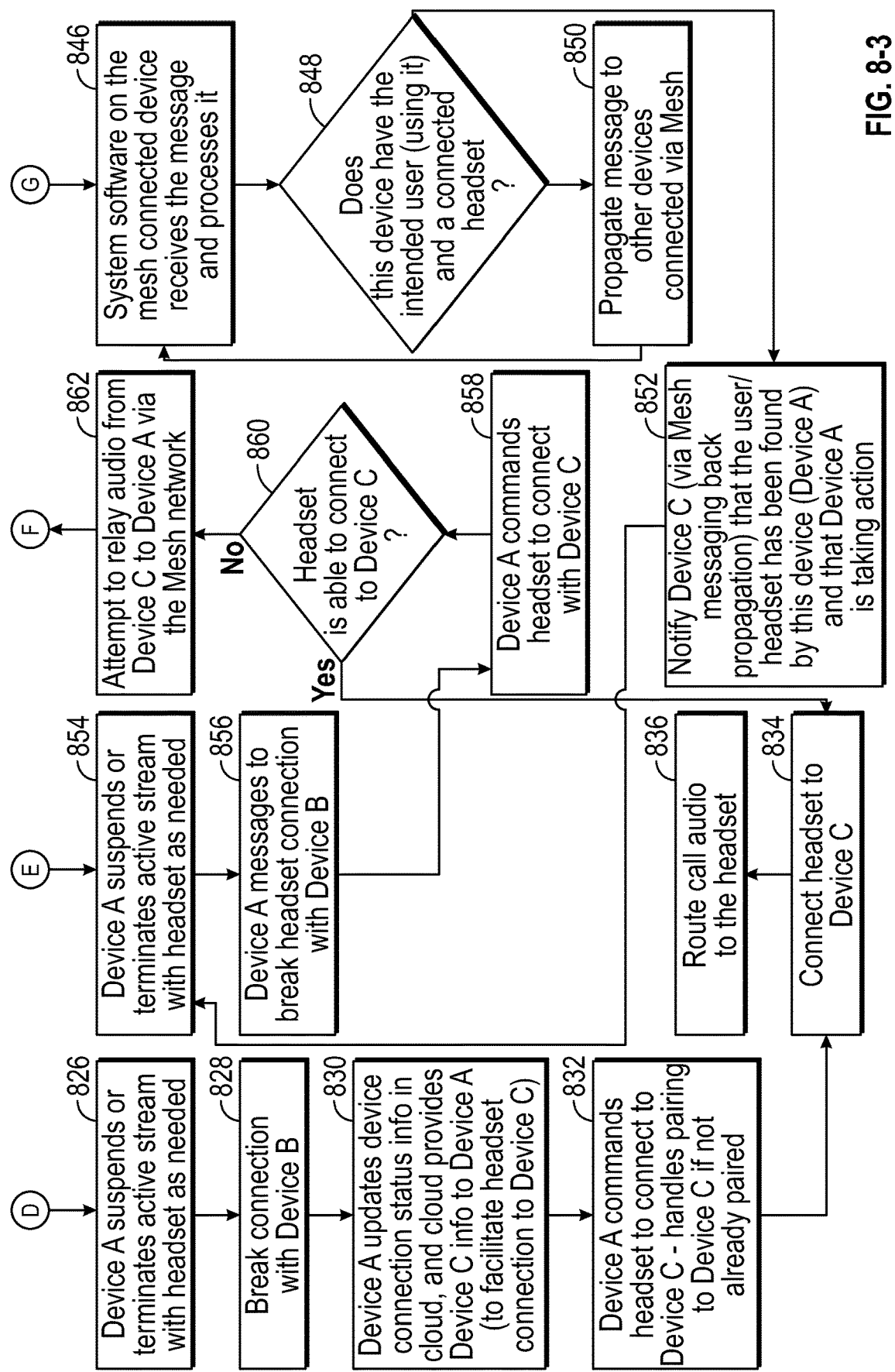

SYSTEMS AND METHODS FOR MANAGING CONNECTIONS BETWEEN A HEADSET AND MULTIPLE DEVICES

TECHNICAL FIELD

The present invention relates to the field of wireless communications, and more particularly, to systems and methods for selectively managing connections between a headset and multiple user devices, for example to enable a headset-supported call at any of a number of connectable user devices.

BACKGROUND

Most wireless headsets, e.g., configured to Bluetooth, DECT, or other wireless communications, are capable of pairing with numerous different user devices (for example, a headset may store pairing knowledge of eight or more user devices), but only capable of connecting to one or two paired user devices at a time. When a call comes in on a particular user device to which the headset is paired (or stores pairing knowledge) but not currently connected, the user may be unable to connect the headset to the particular user device in time to answer the inbound call, as existing processes for changing connections between a headset and multiple user devices is typically complicated and time-consuming.

For example, consider an enterprise worker who uses a UC (unified communications) headset with various user devices, e.g., a PC, a mobile phone, a desk phone, a tablet, etc. The user has previously paired her headset to each of these user devices, but at any given time the headset is connected to only one or two of these user devices (depending on the capabilities of the particular headset). Assume in this example the headset is connected to the user's PC and desk phone (two user devices), and while the user is wearing her headset, a call comes in on her mobile phone, which is paired with but not currently connected to the headset. In order for the user to answer the call on the headset, the headset must connect to the mobile phone, which requires a time-consuming series of actions by the user in conventional systems. For example, in one conventional system, upon noticing the inbound call on the mobile phone that is paired with but not currently connected to the headset, the user must select one of two devices currently connected to the headset, figure out how to disconnect the headset from that device (e.g., from a settings menu), and then subsequently connect the headset to the mobile phone. This process may take a typical user about 15-30 seconds to complete, before which time the call may be forwarded to voice mail or the calling party may terminate the call.

Some headsets are configured to automatically seek out and connect to a maximum number of devices at any given time, e.g., two devices. In the example scenario above regarding an inbound call on the user's mobile device, as soon as the user disconnects the headset from one connected device (to allow the mobile device to be connected to the headset), the headset will automatically attempt to connect to another device. This creates a race condition in which the user must initiate a connection between the mobile device and the headset before the headset automatically connects to another in-range device, e.g., another device that is ranked higher in a connection priority list (of paired user devices) maintained by the headset.

In addition to the problems with answering an inbound call coming in on a user device that is not currently connected to a wireless headset, similar problems exist with using a wireless headset for an outbound call initiated on a user device that is not currently connected to the headset.

Thus, there is a need for improved systems, device, and methods for managing connections between a wireless headset and user devices, for example to handle a call inbound or outbound at user device(s) not currently connected to the headset.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

The above object and other objects are solved by the invention as defined in the independent claims. The dependent claims and the following specification discuss various embodiments.

Systems and methods are disclosed herein for managing connections between a wireless headset and user devices, for example to answer or place a call at a particular user device (e.g., a device that is not currently connected to the headset) as a headset-supported call, i.e., wherein the call audio is routed from the particular user device to the wireless headset and/or vice versa.

Some embodiments provide a cloud-based implementation, in which a cloud-based network, e.g., including one or more remote servers, is configured to control or facilitate the management of connections between the headset and relevant user devices to establish a headset-supported call inbound or outbound at a currently non-connected user device.

Other embodiments provide a mesh-based implementation, in which a local mesh network, instead of a cloud-based network, is configured to control or facilitate the management of connections between the headset and relevant user devices to establish the headset-supported call inbound or outbound at a currently non-connected user device. The mesh network may include, for example, user device(s) connected to the headset and the non-connected user device associated with the inbound or outbound call.

Still other embodiments provide a hybrid cloud/mesh implementation, in which a cloud-based network and a local mesh network cooperate to control or facilitate the management of connections between the headset and relevant user devices to establish a headset-supported call inbound or outbound at a currently non-connected user device.

One aspect provides a method for managing connections between a wireless headset and multiple user devices including (a) at least one connected user device having a connection with the wireless headset and (b) at least one non-connected user device not having a connection with the wireless headset. An inbound call inbound is detected at a particular user device of the multiple user devices at a time when the particular user device is a non-connected user device. A human-perceptible prompt regarding the inbound call is automatically output, and in response, user input is received that indicates an intent to answer the inbound call as a headset-supported call in which call audio is routed to the headset. In response to this user input, the connection between the wireless headset and a first connected user device is automatically broken and a connection between the wireless headset and the particular user device is automatically established. The inbound call is answered at the particular user device. Audio call data is routed from the particular user device (now connected to the wireless headset) to the wireless headset and/or vice versa.

In some embodiments, automatically breaking the connection between the wireless headset and the first connected user device comprises interrupting, at least temporarily, communications between the wireless headset and the first connected user device.

In another embodiments, automatically breaking the connection between the wireless headset and the first connected user device comprises terminating the connection between the wireless headset and the first connected user device.

In some embodiments, the inbound call is answered at the particular user device before the wireless headset is connected to the particular user device. In other embodiments, the inbound call is answered at the particular user device after the wireless headset is connected to the particular user device.

In some embodiments, the human-perceptible prompt regarding the inbound call comprises an audible, visual, or haptic notification via an output device of the first connected user device, the particular user device, or the wireless headset.

In some embodiments, the user input indicating an intent to answer the inbound call as a headset-supported call comprises a defined voice input or manual input received at the first connected user device, the particular user device, or the wireless headset.

In some embodiments, receiving user input indicating an intent to answer the inbound call as a headset-supported call comprises automatically detecting a donning of the wireless headset by a user, e.g., by a don/doff sensor provide in the wireless headset.

In some embodiments, the method further includes selecting a second connected user device of the multiple user devices to act as a connection control device to facilitate the establishment of the connection between the wireless headset and the particular user device.

In some embodiments, selecting the second connected user device to act as the connection control device includes a remote server accessing device connection data identifying the at least one connected user device having a connection with the wireless headset, and selecting the second user device from the at least one connected user device.

In some embodiments, the facilitation of the connection between the wireless headset and the particular user device by the second connected user device includes (a) the second connected user device obtaining information regarding the particular user device from a remote server and (b) the second connected user device using the obtained information regarding the particular user device to instruct the headset to establish a connection with the particular user device.

In some embodiments, the second connected user device suspends or terminates an active audio stream from the second connected user device to the headset prior to the establishment of the connection between the wireless headset and the particular user device.

In some embodiments, the method includes selecting a second connected user device of the multiple user devices to act as a connection control device to (a) output or cause the output of the human-perceptible prompt regarding the inbound call and (b) facilitate the establishment of the connection between the wireless headset and the particular user device.

In some embodiments, the second connected user device, acting as the connection control device, facilitates the breaking of the connection between the wireless headset and the first connected user device.

In some embodiments, the wireless headset is connected to a local mesh network including a plurality of mesh network devices including (a) the at least one connected user device and (b) the particular user device, and the method further includes selecting a connection control device from the plurality of mesh network devices to facilitate the establishment of the connection between the wireless headset and the particular user device. In some embodiments, the selection of the connection control device from the plurality of mesh network devices includes (a) the particular user device sending a request message via the mesh network, (b) at least one of the mesh network devices receiving the request message, and (c) each respective mesh network device that receives the request message determining whether it (the respective mesh network device) is suitable to act as the connection control device, wherein only connected user devices are suitable to act as the connection control device.

In some embodiments, the connection control device (a) outputs the human-perceptible prompt regarding the inbound call, (b) notifies the particular user device to answer the inbound call in response to the user input indicating an intent to answer the inbound call as a headset-supported call, and (c) instructs the headset to establish a connection with the particular user device.

Another aspect provides a method for managing connections between a wireless headset and multiple user devices including (a) at least one connected user device having a connection with the wireless headset and (b) at least one non-connected user device not having a connection with the wireless headset. The method includes causing an output of a human-perceptible prompt in response to a detection of an inbound call inbound at a particular user device at a time when the particular user device is a non-connected user device; receiving user input responsive to the human-perceptible prompt, the user input indicating an intent to answer the inbound call as a headset-supported call in which call audio is routed to the headset; in response to the user input indicating an intent to answer the inbound call as a headset-supported call, (i) initiating a breaking of the connection between the wireless headset and a first connected user device of the multiple user devices and (ii) initiating an establishment of a connection between the wireless headset and the particular user device, thereby establishing the particular user device as a connected user device; and causing the particular user device to answer the inbound call and route audio call data to the wireless headset for audible output via at least one speaker of the wireless headset.

Another aspect provides a system for managing connections between a wireless headset and multiple user devices including (a) at least one connected user device having a connection with the wireless headset and (b) at least one non-connected user device not having a connection with the wireless headset. The system includes logic instructions stored in non-transitory computer readable media and executable by at least one processor to (a) cause an output of a human-perceptible prompt in response to detecting an inbound call inbound at a particular user device at a time when the particular user device is a non-connected user device; (b) receive user input in response to the human-perceptible prompt, the user input indicating an intent to answer the inbound call as a headset-supported call in which call audio is routed to the headset; (c) in response to the user input indicating an intent to answer the inbound call as a headset-supported call: (i) initiate a breaking of the connection between the wireless headset and a first connected user device of the multiple user devices and (ii) initiate an establishment of a connection between the wireless headset and the particular user device, thereby establishing the particular user device as a connected user device; and (d) cause the particular user device to answer the inbound call and route audio call data to the wireless headset for audible output via at least one speaker of the wireless headset.

BRIEF DESCRIPTION OF THE DRAWINGS

The present invention will be readily understood by the following detailed description in conjunction with the accompanying drawings, wherein like reference numerals designate like structural elements.

FIG. 3 illustrates a table defining an example set of rules for selecting a particular user device to designate as the "connection control device" for facilitating connection of a user device to a headset, e.g., to answer a call incoming at the user device via the headset, according to some embodiments;

FIGS. 5B-1 and 5B-2 collectively show a flowchart of a second example process flow for a "mesh-based" implementation for managing connections between a headset and multiple user devices to handle an inbound call coming in at a non-connected user device, according to one example embodiment;

FIGS. 7-1 and 7-2 collectively show a flowchart of a process flow for an example "hybrid cloud/mesh" implementation for managing connections between a headset and multiple user devices to handle an inbound call coming in at a non-connected user device, according to one example embodiment;

FIGS. 8-1, 8-2, and 8-3 collectively show a flowchart of an example process flow for managing connections between a headset and multiple user devices to handle an outbound call to be made at a currently non-connected user device, according to one example embodiment.

DETAILED DESCRIPTION

Figure 1A:
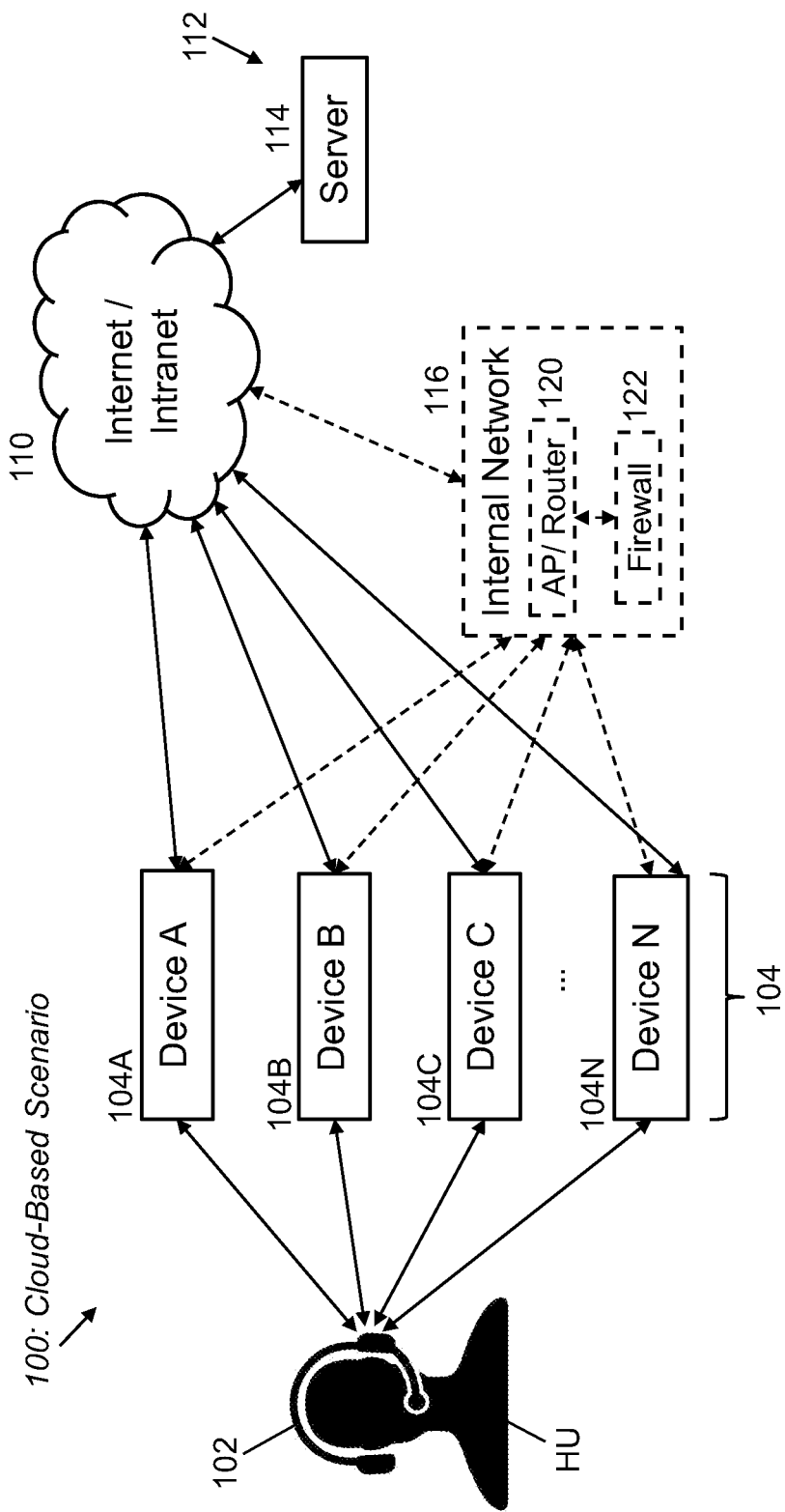
FIG. 1A illustrates an example system for a "cloud-based" implementation for managing connections between a headset and multiple user devices, e.g., to handle an inbound or outbound call, according to one example embodiment.

Methods and apparatuses for optimizing link settings to improve wireless interference and/or user density in wireless audio communications are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

As discussed above, some embodiments or implementations of the present invention may involve cloud-based systems and methods, mesh network-based systems and methods, or a hybrid or combination of cloud- and mesh network-based systems and methods, for managing connections between a headset and multiple user devices, e.g., to handle an inbound or outbound call at a particular user device. In some systems or environments, only one or two of such solutions may be available, based on the technical capabilities (e.g., hardware, software, and/or firmware) of the relevant system components. For instance, in some systems or environments, the relevant available devices (e.g., headset, user devices, local mesh network device(s), and/or back-end server(s)) may be configured for cloud-based systems and methods, or for mesh network-based systems and methods.

In other systems or environments, the technical capabilities (e.g., hardware, software, and/or firmware) of the relevant system components may support multiple different solutions disclosed herein, e.g., two or more of (a) a cloud-based solution, (b) a mesh network-based solution, and (c) a hybrid or combination of cloud- and mesh network-based systems. In such systems or environments, one or more relevant system components may select a particular solution to implement for each respective situation, e.g., inbound or outbound call at a particular user device.

FIG. 1A illustrates an example system 100 for a "cloud-based" implementation for managing connections between a headset and multiple user devices, e.g., to handle an inbound or outbound call, according to one example embodiment of the present invention. System 100 provides a "cloud-based" solution in that certain aspects of the solution are provided by a back-end system 112 (e.g., including a back-end server 114) connected to the user devices via the internet or other "cloud" network.

As shown, system 100 may include (a) a wireless headset 102 associated with a headset user HU and configured for wireless communications with at least one other device, (b) multiple user devices 104 (104A, 104B, 104C, . . . 104N) each configured for wireless (and/or wired) pairing and connection to the wireless headset 102, and (c) a back-end system 112 including at least one server 114 providing certain functionality of system 100. User devices 104 may be configured to connect to back-end system 112 via the internet, an intranet, or other wide area network 110 in any suitable manner and via any intermediate network devices. For example, user device 104 may connect to network 110 "directly" via a 3G, 4G, 5G. As another example, user device 104 may connect to network 110 "indirectly" via an internal or local network 116, if present. Internal or local network 116 may include at least one WiFi access point or router 120 and communications firewall or other network security system 122. Each user device 104 may be connected to the WiFi access point or router 120 by wireless WiFi connection or by wired connection (e.g., Ethernet). The internal/local network 116, along with connections with devices 104, are indicated in FIG. 1A by dashed lines, indicating such features may be optional or not present, depending on the particular embodiment or implementation.

Each user device 104 may include any type of device configured for wireless (and/or wired) connection to headset 102 for communicating (e.g., forwarding or transferring) voice data or other audio data from the device to the wireless headset and/or vice versa, for example, a smart phone or other mobile phone, tablet computer, laptop computer, desktop PC, smart watch, assistant device (e.g., Amazon Alexa or Echo, etc.), home entertainment system, vehicle-based telecommunication system or infotainment system, or any other type of device configured for wireless connection to a headset. Each user device 104 may be configured to communicate with headset 102 via any one or more wireless communications protocol, e.g., Bluetooth (e.g., Bluetooth Classic or Bluetooth derivatives such as Bluetooth Low Energy (BLE)), Digital Enhanced Cordless Telecommunications (DECT), IEEE 802.11 (WiFi), or other packet-based wireless communications protocol. Some user devices 104 may also be configured for an optional wired (i.e., corded) connection to headset 102 via a suitable type of cable and/or communications protocol, e.g., via USB, 3.5 mm audio jack, etc.

Wireless headset 102 may be paired with any number of user devices 104 (e.g., 8 or more device 104), which number may or may not be limited by the capabilities or configuration of headset 102, but may be connected to only a specified limited number of paired user devices 104 (e.g., only one or two paired user device 104) at any given time, depending on the particular embodiment or relevant configuration of headset 102.

As used herein, the terms "pairing" and "connecting" have their well-known meanings in the art in the field of wireless communications, e.g., Bluetooth communications between devices. Thus, a headset 102 "pairing" with a user device 104 refers to the two devices establishing permissions for communicating with each other. After pairing with the user device 104, the headset 102 may "connect" with the user device 104, which allows active communication of data (e.g., voice data, streaming audio, etc.) between the user device 104 and headset 102, in either or both directions. Wireless headset 102 may store pairing information regarding a number of user devices 104 that have been paired with the headset 102 over time. In some embodiments, headset 102 may access such stored pairing information for selectively connecting to different user devices 104 (a) to effect device connections instructed by defined user actions or inputs, and (b) to automatically connect a paired but not-currently-connected user device 104 to the headset 102 to handle an inbound call coming in at the user device 104, e.g., to take the call at the headset 102. Typically, each user device 104 needs to be paired with the headset 102 only once (with the headset 102 and/or the user device 104 storing the pairing information for subsequent connections between the two devices), unless and until a user or one of the devices actively unpairs the devices.

Figures 1B, 1C, 1D:
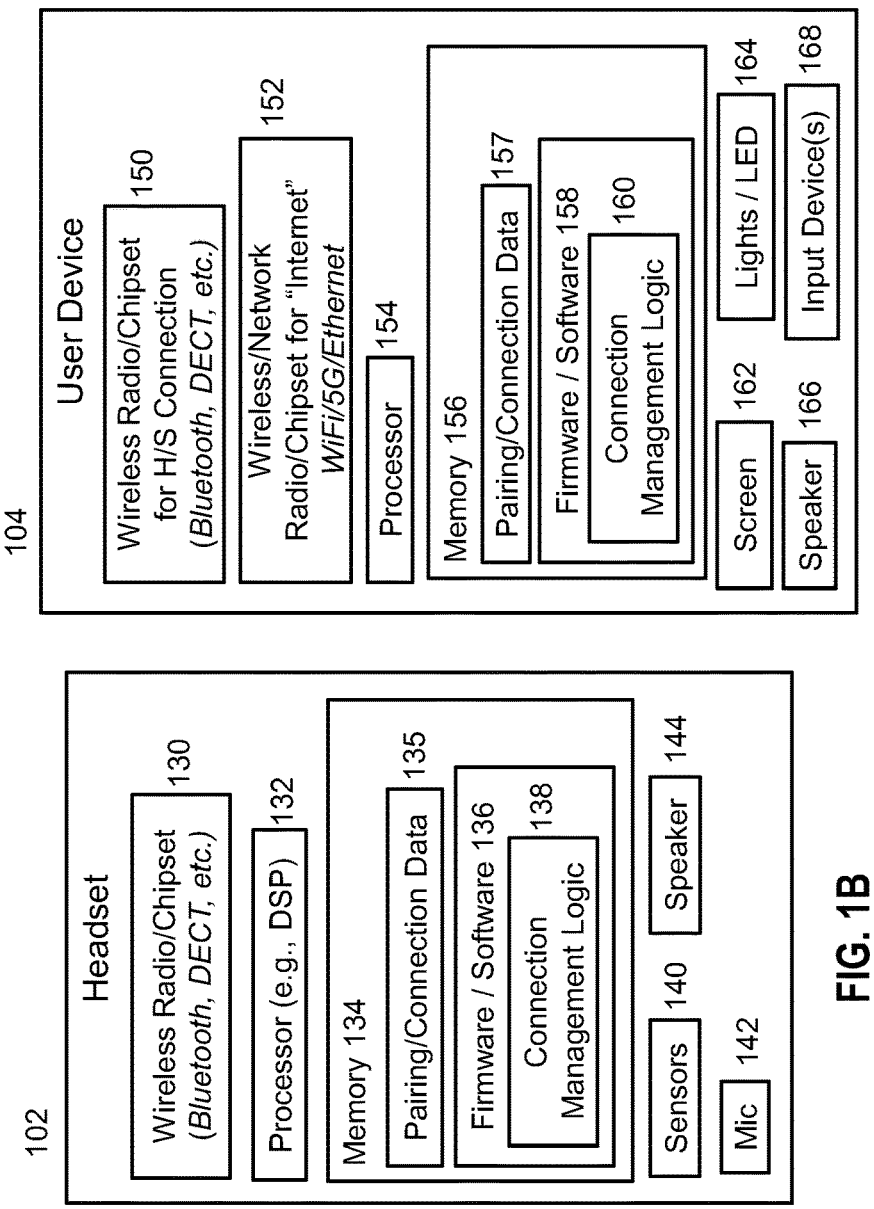
FIG. 1B illustrates selected components of an example wireless headset for use in systems and methods disclosed herein, according to certain embodiments.
FIG. 1C illustrates selected components of an example user device for use in systems and methods disclosed herein, according to certain embodiments.
FIG. 1D illustrates selected components of an example back-end server for use in "cloud-based" embodiments or implementations of the invention.

FIG. 1B illustrates selected components of an example wireless headset 102 that may be relevant to the systems and methods disclosed herein, according to certain embodiments of the present invention. Wireless headset 102 may be used in any system according to the present invention, e.g., system 100 shown in FIG. 1A, as well as systems 400 and 600 shown in FIGS. 4 and 6, discussed below. Wireless headset 102 may be configured to operate according to any known wireless standards and protocols, e.g., Unified Communications (UC) standards and protocols.

As shown, the example wireless headset 102 may include (a) a wireless radio or chipset 130 for wireless communications with user devices 104 (e.g., according to Bluetooth, DECT, or any other suitable wireless protocol), (b) at least one processor (e.g., DSP) 132, (c) memory device(s) 134, (d) sensor(s) 140, (d) a microphone 142, and (e) sensor(s) 144.

Memory 134 may store any data and/or logic code associated with the operation of headset 102, including pairing/connection data 135 and firmware/software 136. Pairing/connection data 135 may include (a) pairing data for each of a number of user devices 104, including security keys or other authentication data established or obtained from each user device 104 during a pairing process between the respective user device 104 and headset 102, and (b) connection data indicating whether each user device 104 paired with headset 102 is currently connected to headset 102. Firmware/software 136 may include software, firmware, and/or other logic instructions for performing any functionality of headset 102. System 100 shown in FIG. 1A, and similarly systems 400 and 600 shown in FIGS. 4 and 6, may include any suitable software, firmware, and/or other logic instructions for providing the functionality disclosed herein for managing connections between a headset 102 and multiple user devices 104. In some embodiments, connection management logic (e.g., software components) may be installed on or otherwise accessible to each relevant device in the system (e.g., system 100, 400, or 600). Thus, headset memory 134 may include connection management logic 138 executable to perform various functions associated with managing connections between headset 102 and user devices 104 as disclosed herein. In some embodiments, connection management logic 138 may comprise an application or a background task installed or programmed on headset 102, e.g., during manufacturing or initial imaging or configuration of the headset 102, or subsequently via a desktop or mobile hub.

Sensor(s) 140 may include a don/doff sensor configured to detect whether the headset 102 is currently being worn by a user HU, and/or any other type(s) of sensors. Microphone 142 is configured to detect and process voice and/or audio data, and speaker(s) 144 are configured to output voice and/or other audio data to user HU.

FIG. 1C illustrates selected components of an example user device 104 that may be relevant to the systems and methods disclosed herein, according to certain embodiments of the present invention. The example user device 104 shown in FIG. 1C may be used in any system according to the present invention. For example, the example user device 104 shown in FIG. 1C may represent one or more of the user devices 104A, 104B, 104C . . . 104N of system 100 shown in FIG. 1A, system 400 shown in FIG. 4, or system 600 shown in FIG. 6.

As discussed above, each user device 104 may include any type of device configured for wireless (and/or wired) connection to wireless headset 102 for communicating voice or other audio data between the user device 104 and headset 104. For example, each user device 104 may be a smart phone, other mobile phone, tablet computer, laptop computer, desktop PC, smart watch, assistant device (e.g., Amazon Alexa or Echo, etc.), home entertainment system, vehicle-based telecommunication, etc. User device 104 shown in FIG. 1C is an example device only; other user devices 104 used in systems according to the present invention may omit one or more component shown in FIG. 1C, or may include one or more additional components relevant to the functioning of the relevant connection management system.

As shown, the example user device 104 may include (a) a wireless radio or chipset 150 for wireless communications with wireless headset 102 and/or other local wireless device(s) (e.g., according to Bluetooth, DECT, or any other suitable wireless standard or protocol), and (b) at least one wireless network radio and/or chipset 152 for wired and/or wireless access to internet communications (e.g., a WiFi radio/chipset for wireless connection to a local WiFi access point or router; a 3G, 4G, 5G, or other mobile network radio/chipset, an Ethernet chipset for wired Ethernet connection to an internet access point or router, etc.). The user device 104 may also include at least one processor 154; memory device(s) 156; a display screen 162; LEDs or other visual indicators 164; a speaker 166; and/or one or more input devices 168, e.g., a keyboard or keypad, mouse, touchscreen, buttons, sliders, switches, a microphone, and/or any other type of input device.

Memory 156 may store any data and/or logic code associated with the operation of user device 104, including pairing/connection data 157 and firmware/software 158. Pairing/connection data 157 may include pairing data for headset 102, including security keys or other authentication data established or obtained from headset 102 during a pairing process between the user device 104 and headset 102. Firmware/software 158 may include software, firmware, and/or other logic instructions for performing any functionality of user device 104. In particular, user device memory 156 may include connection management logic 160 for performing various functions associated with managing connections between the user device 104 (and other user device(s) 104) and headset 102, as disclosed herein. For example, connection management logic 160 may be executable to facilitate connection of user device C to headset 102 for answering an incoming call on device C at the headset 102. In some embodiments, connection management logic 160 may comprise an application or a background task installed or programmed on each user device 104. e.g., during manufacturing or initial imaging or configuration of the user device 104, or subsequently via a desktop or mobile hub. Example functionality provided by connection management logic 160 is discussed below in more detail.

Figure 6:
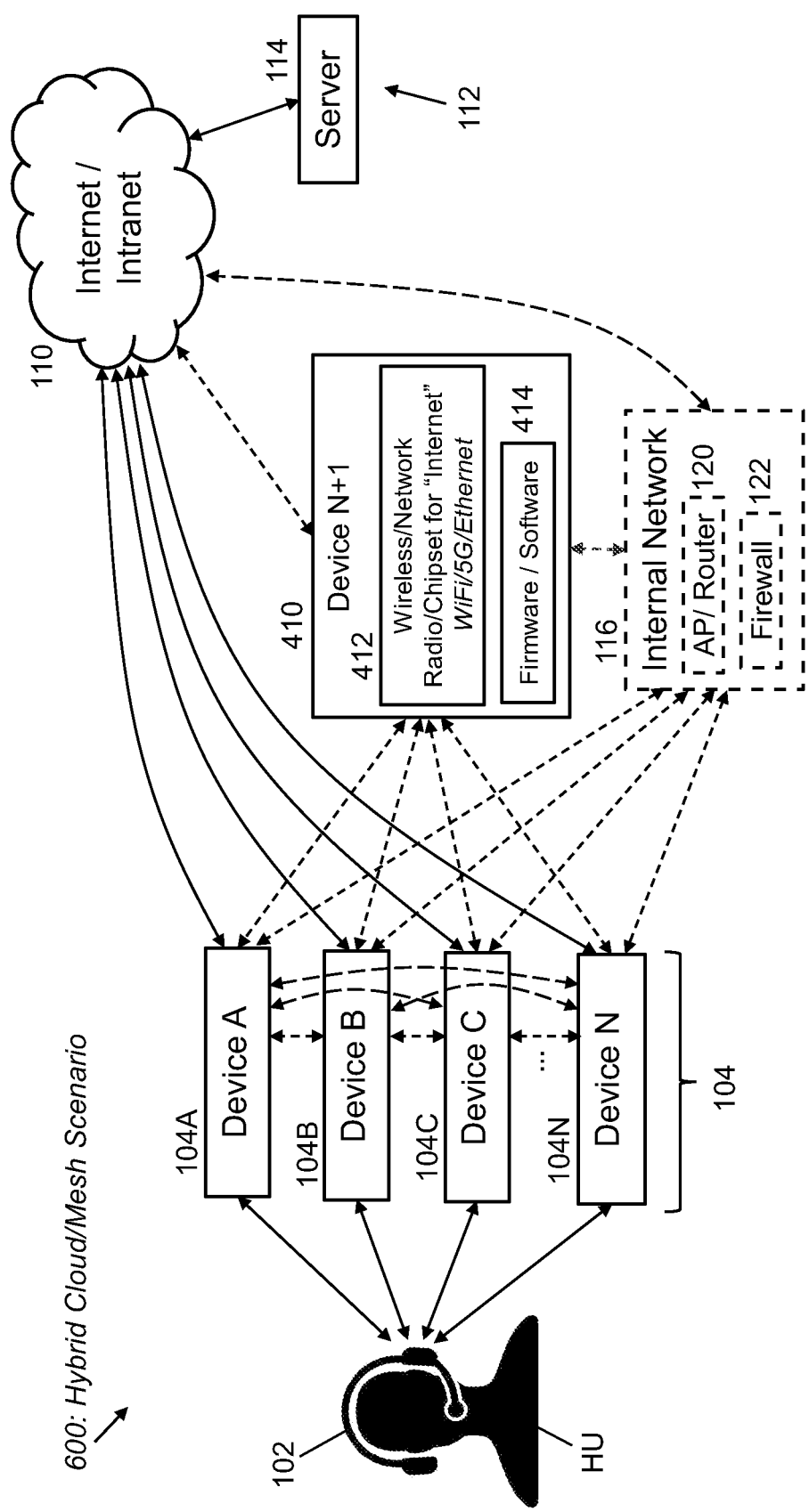
FIG. 6 illustrates an example system for a "hybrid cloud/mesh" implementation for managing connections between a headset and multiple user devices, e.g., to handle an inbound or outbound call, according to one example embodiment.

FIG. 1D illustrates selected components of an example back-end server 114 "cloud server" of a back-end system 112 that may be available and utilized in certain embodiments or implementations of the present invention, e.g., in the example "cloud-based" implementation shown in FIG. 1A and the example "hybrid cloud/mesh" implementation shown in FIG. 6. A back-end system 112 may comprise a back-end server 114, multiple back-end servers 112, and/or any additional back-end data processing and/or storage devices.

As shown, the example back-end server 114 may include at least one API interface 180, at least one processor 182, memory device(s) 184, and at least one web server 192. Server memory 184 may store any data and/or logic code associated with the operation of server 114. For example, server memory 184 may store firmware/software 188 and device data 186. Server firmware/software 188 may include connection management logic 190 executable to perform various functions associated with the systems and methods disclosed herein. Device data 186 may include information regarding each device, including each headset(s) 102 and user device(s) 104, associated with each of multiple different users HU, which may include any of the following types of information: (a) device information (e.g., indicating the device type, device model, device specifications, device settings, etc.), (b) device identification information (e.g., a device-defined ID such as MAC address, IP address, or UUID (e.g., Secure Android ID); or a software-defined ID such as a device name selected by the user upon downloading connection management logic 160 on the respective device 102, 104)), (c) device security/authentication information (e.g., security settings, keys, etc.), (d) current and/or historical pairing and connection status information for each user device 104 with respect to each headset 102 associated with a respective user, (e) current and/or historical device status, e.g., donned/doffed status of each headset 102, a preferred headset 102 of a respective user (where multiple headsets are associated with the respective user), power-on/power-off status of each user device 104, etc., and/or (f) any other relevant information regarding each headset 102 and/or user device 104.

In some embodiments, certain device data 186 may be obtained by server 114 via user accounts managed by server 114. For example, each user may create an account at server 114, and register their devices 102/104 with system 100. Such registration process may be performed for each headset 102 and user device 104 of system 100, e.g., initiated automatically or in response to defined user input or action, and may involve each respective device 102/104 sharing each respective device 102/104 with server 114. In some embodiments, server 114 may receive updates regarding the status of a user's devices, including which devices 104 are currently connected to each headset 102 of the user, when the user is logged in to their user account. In one embodiment, the connection management logic 136, 160 of each device 102, 104 may include PubNub or other suitable networking module configured to poll and push the current status of each respective device 102, 104 to server 114 at regular intervals.

Returning to the cloud-based embodiment 100 shown in FIG. 1A, an example process is now described for answer an incoming call coming in on a particular user device 104. In this example, each user device 104 (including Device A, Device B, and Device C) includes connection management logic (e.g., software) 160 installed thereon or otherwise accessible to the respective user devices 104. The connection management logic 160 on each user device 104 listens for an incoming call (e.g., either a native call or soft client call). In this example, assume an inbound call coming in at Device C ("Device C inbound call") is detected by Device C. In response, connection management logic 160 at Device C determines if Device C is currently connected to a headset for user HU to answer the Device C inbound call on. If connection management logic 160 determines no headset is connected, it sends a notification to the cloud (e.g., server 114) to take action. Alternatively, if connection management logic 160 determines a headset is connected to Device C, logic 160 handles the action locally, but may also send a notification to the cloud (e.g., server 114) indicating the inbound call and the action taken by Device C.

In the event connection management logic 160 on Device C determines and notifies server 114 that no headset is connected to Device C, connection management logic 190 at server 114 may review stored device data 186 to identify a user/headset combination pair that could answer the Device C inbound call at the headset if the user/headset was connected to Device C. In this example, logic 190 may identify, based on device data 186, user HU and headset 102 as a user/headset combination pair that can be used answer the Device C inbound call. Connection management logic 190 at server 114 may then identify which devices the user/headset combination are currently connected to—in this example Device A and Device B. In one implementation (shown in FIG. 2A, discussed below), logic 190 of server 114 selects Device A or Device B as a "connection control device," based on any suitable rules or algorithm (e.g., rules set forth in table 300 of FIG. 3 discussed below) to control certain aspects of the following device connection management process (such as controlling and notifying the headset 102), and then subsequently communicates only with the selected user device (Device A or Device B). Assuming server 114 selects Device A for controlling/notifying headset 102, it then directs Device A to output a call notification (e.g., a visual, audible, or haptic notification) to notify the user HU of the Device C inbound call output by Device A). Alternatively (or additionally), server 114 may direct headset 102 and/or Device B to output a call notification (e.g., a visual, audible, or haptic notification) to notify user HU of the Device C inbound call.

Upon receiving the call notification, the user HU may indicate their intention to either answer or ignore the Device C inbound call by providing defined user input at a specified device, e.g., headset 102 or Device A, which user input may be automatically forwarded to server 114 for processing by logic 190. The user HU may provide user input regarding the Device C inbound call in any suitable manner defined by the respective devices or implementation. For example, the user may press a designated button on headset 102, speak a defined voice command to microphone 142 of headset 102, or by donning the headset 102 (which may be detected by a don/doff sensor 140). In the case of indicating intent by donning the headset 102, the user HU may be unable to receive an audible call notification via the headset 102, as they would not be wearing the headset 102 at the time of the call notification. In some embodiments, the relevant system logic, e.g., embodied in server logic 190 in the embodiment of FIG. 1A, may monitor or determine the don/doff state of the headset 102 (based on information from don/doff sensor 140 of headset 102), and upon determining the headset 102 is off at the time of the Device C inbound call, direct Device A (or Device B) to display or otherwise output the call notification. The user HU may then indicate their intent to answer the Device C inbound call on the headset 102 by donning the headset 102.

Assuming the user HU indicates an intent to answer the Device C inbound call, the selected connection control device (as discussed above, in this example server 114 selected Device A as the connection control device) works in conjunction with the headset 102 and back-end server 114 to initiate a series of actions. Major actions include the following (and may occur in sequence or simultaneously depending on the particular implementation): (1) breaking the existing connection between headset 102 and Device B, (2) notifying the user HU that their intent has been recognized and they are being connected to the Device C inbound call via the headset 102, (3) Device A notifying server 114 of the user's intent to answer the Device C inbound call, (4) answering the Device C inbound call, (5) connecting headset 102 to Device C (if Device C was previously paired to headset 102) or pairing and connecting headset 102 to Device C (if Device C was not previously paired to headset 102, or was unpaired from headset 102), (6) ensuring that the Device C call audio is routed to and from the headset 102 as the primary audio device, (7) gracefully handling fail conditions, e.g., connection issues or loss of signal issues during the connection, or call disconnected (hung up) by the calling device during the connection process—in order to ensure that the user has a clear and expected experience where their intent has been properly actioned. The various actions are shown and discussed in more detail below with reference to the flowchart shown in FIG. 2A.

In some embodiments, system 100 is further configured to collect and analyze various analytics regarding call management. For example, system 100 may collect and analyze (a) a number or proportion of incoming calls that come in at each user device 104 or device type; (b) a number and proportion of calls answered by each user device 104 or device type; and/or (c) historical user preferences on whether to answer or ignore incoming calls, and where to answer incoming calls (e.g., at the user device 104 receiving the call, or at the headset 102) for multiple different scenarios or modalities. System 100 may the use such historical data to customize the management of incoming calls for the respective user HU, for example by selecting or modifying the type of call notification or device(s) at which call notifications are output, based on the user's historical activity.

Figure 2A:
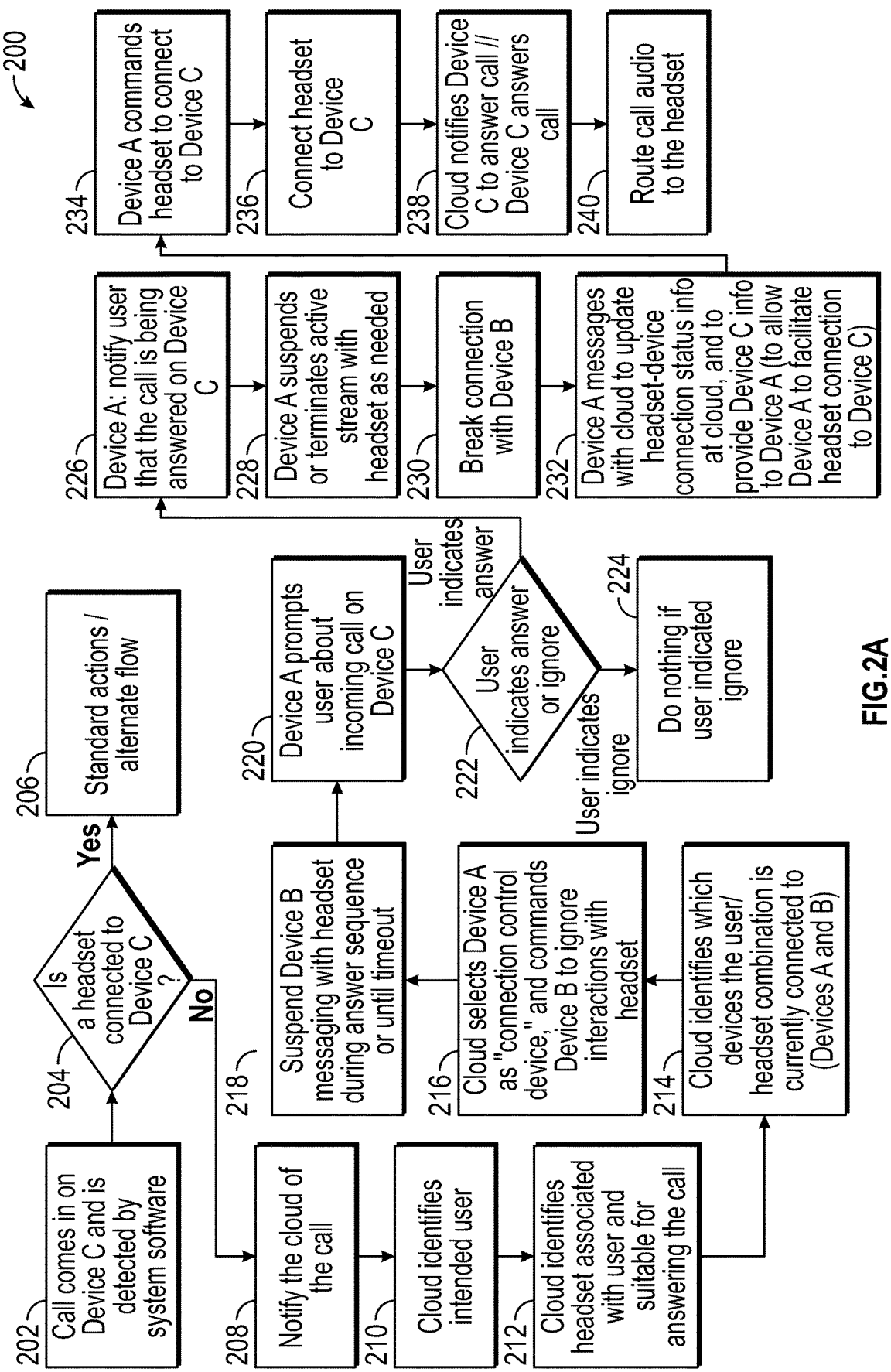
FIG. 2A is a flowchart of a process flow for an example "cloud-based" implementation for managing connections between a headset and multiple user devices to handle an inbound call coming in at a non-connected user device, according to one example embodiment.

FIG. 2A is a flowchart of an example process 200 for a "cloud-based" implementation for managing connections between a headset and multiple user devices to handle an inbound call at a non-connected user device, according to one example embodiment. Example process 200 may be implemented by the example cloud-based system 100 shown in FIG. 1A, discussed above.

Figure 2B:
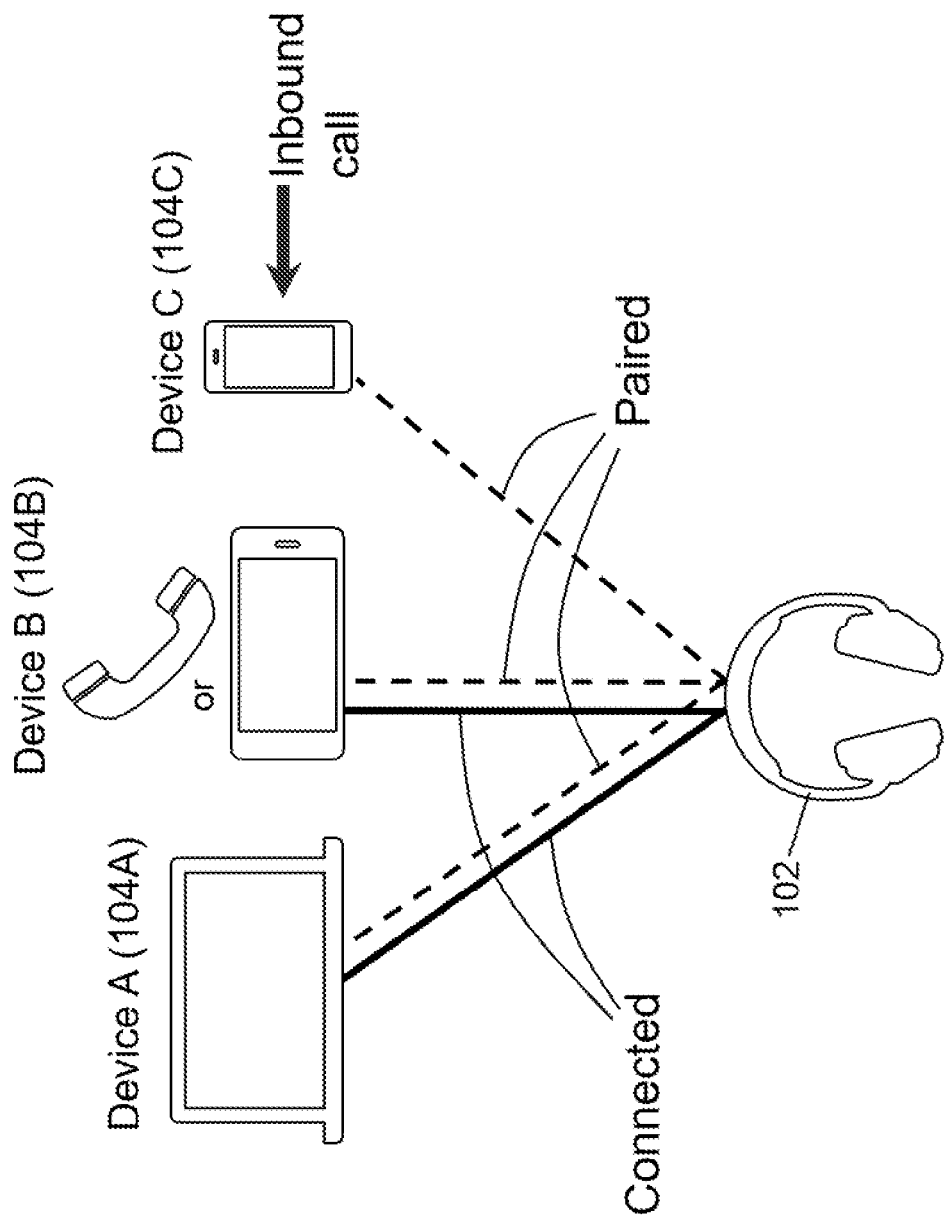
FIG. 2B illustrates the connections between the headset and relevant user devices involved in the example process flow shown in FIG. 2A.

FIG. 2B illustrates the connections between the headset and relevant user devices (Devices A, B, and C) involved in the example process 200 shown in FIG. 2A and discussed below. It should be understood that the particular types of devices depicted for Devices A, B, and C are examples only; each Device A, B, and C may be any suitable type of user device 104. In addition, it should be understood that headset 102 may be paired with any number of additional user devices 104, i.e., in addition to Devices A, B, and C.

Turning to FIG. 2A, at 202, a call comes in on a particular user device 104 associated with user HU, namely Device C, which is detected by connection management logic 160 on Device C ("Device C inbound call"). As shown in FIG. 2B, at the time of the Device C inbound call, a headset 102 is paired with Devices A, B, and C, and currently connected with Devices A and B but not Device C. At 204, connection management logic 160 determines if Device C is currently connected to a headset 102 for answering the Device C inbound call by invoking the APIs 180 of the back-end server 114 to access device data 186, which maintains the current connection state of each user device, including user device 104, in real time. If connection management logic 160 determines Device C is currently connected to a headset 102, the call may be answered at the headset 102 according to any suitable protocol at 206. Alternatively, if connection management logic 160 determines Device C is not connected to a headset 102, it notifies the cloud (in this example, back-end server 114) of the Device C inbound call at 208. At 210, server 114 may identify the user HU associated with Device C, e.g., based on stored device data 186.

After identifying the user HU, at 212 server 114 may identify a particular headset 102 for answering the Device C inbound call, e.g., based on which headset 102 associated with the user HU (if multiple) is currently in use by the user (e.g., based on the donned/doffed status of each headset) and/or the user's headset preferences (if any), e.g., based on stored device data 186. At 214, server 114 may identify, e.g., based on stored device data 186, which user devices 104 are currently connected (i.e., active connections) to the headset 102 identified at 212. In this example, server 114 may determine Device A and Device B are currently connected to the headset 102. At 216, server 114 may select and designate a particular user device 104—in this example, Device A—as a "connection control device" for performing control/notification actions (e.g., interacting with headset 102) during subsequent steps. Server 114 may select the user device to designate as the connection control device (in this example, either Device A or Device B) based on any suitable rules or algorithm. For example, server 114 may select the most recently used device from Device A and Device B as the connection control device; for instance, if Device A is currently streaming audio on headset 102, server 114 selects Device A as the connection control device. In one particular embodiment, server 114 may select the user device to designate as the connection control device based on the rules set forth in table 300 shown in FIG. 3, discussed below.

In some embodiments, steps 210-214 may be performed in real time after detecting the Device C inbound call by maintaining regular communication between each of the user's devices, e.g., Devices A-C and back-end server 114. In other embodiments, one or more (or all) of steps 210-214 may be performed prior to the Device C inbound call, e.g., periodically and automatically, which may reduce the real-time processing time for method 200.

Upon being designated as the connection control device at 216, at 218 Device A may instruct other user devices, including Device B, to interrupt messaging between Device B and headset 102 going forward, which may involve (a) suppressing messaging but maintaining the connection between Device B to headset 102 to help prevent the sending of unintentional duplicate messages from back-end server 114 to the currently connected devices, e.g., for the event in which the user chooses to ignore the Device C inbound call at 222 (wherein messaging between Device B and headset 102 may be easily restored without needing to reconnect Device B), or (b) actually disconnecting Device B from headset 102 at this point.

At 220, Device A may prompt the user HU of the Device C inbound call, e.g., by outputting a visual, audible, and/or haptic notification (or sending a command to output such notification) at one or more of headset 102, Device A, Device B, or Device C, e.g., depending on the particular embodiment, system settings, and/or call management settings at each respective device 102/104. In some implementations or situations, the prompt output or initiated by Device A may indicate a request or opportunity for defined user input(s) that indicate the user's intent for handling the incoming call, e.g., answering the call at headset 102, answering the call at Device C, ignoring the call, forwarding the call to voice mail, etc. The prompt may indicate a specific user input (e.g., a specified button press, touchscreen interaction, or verbal command by the user) corresponding with each available option for handing the incoming call, and the particular device 102/104 configured to receive such input.

For example, Device A may instruct the headset 102 to play a voice prompt informing the user HU of the Device C inbound call and providing instructions for the user to select a desired action regarding the call. For example, headset speaker 144 may play the following voice prompt "You are receiving a call from [caller's name] on your iPhone. If you wish to answer the call on this headset, press and hold the button on the right earphone until you hear a confirmation tone. If you wish to answer the call on your iPhone, remove your headset and follow the instructions on your iPhone screen. If you wish to ignore the call, do not take any action." As another example, headset speaker 144 may play a voice prompt requesting a verbal command from the user, for example "You are receiving a call on your laptop work phone. To answer the call on this headset, say answer on headset. To ignore the call, say ignore"). As yet another example, Device A may display a virtual interface on a touchscreen 162 of Device A (or Device B or Device C) providing the user HU at least one option for handing the incoming call, for example, a first virtual button or slider to answer the call on headset 102, a second virtual button or slider to send the call directly to voice mail (associated with Device C), and a second virtual button or slider to ignore the call.

At 222, user input may be received at any relevant device 102/104 in response to the prompt output at 220, to indicate the user's intent for handling the incoming call, e.g., answering the call as a headset-supported call (i.e., answering the call such that the call audio is routed from Device C to the headset 102 and vice versa), answering the call at Device C, ignoring the call, forwarding the call to voice mail, etc. For example, the user HU may press a button on headset 102 indicating an intent to answer the call as a headset-supported call, or press a virtual button displayed on a touchscreen 162 of Device A, Device B, or Device C indicating an intent to answer the call at headset 102, or press another displayed virtual button indicating an intent to ignore the call. Or, the user HU may elect to take no action, to thereby ignore the call.

If the user action (or lack of action) indicates an intent to ignore the call, the call is ignored at 224, which may roll to voice mail (depending on the configuration or settings at Device C), and the headset 102 remains connected to Devices A and B, and the message suppression of Device B (initiated at 218) may be cancelled. Alternatively, if the user action indicates an intent to answer the call as a headset-supported call (i.e., to answer the Device C inbound call with the call audio being routed to headset 102), at 226 Device A may begin facilitating the process for answering the call on headset 102. As this process may require a noticeable time to complete, e.g., a delay of 2-7 seconds resulting largely from inherent latencies related to Bluetooth or the relevant wireless protocol(s) involved, at 226 Device A may notify the user HU that the Device C inbound call is being answered at the headset 102 and that there will be a short delay to complete the process, e.g., to avoid the user concluding the call answering process has failed and taking some action to terminate the call. Device A may provide such notification by outputting a visual or audible notification (or sending a command to output such notification) at one or more of headset 102, Device A, Device B, or Device C, e.g., depending on the particular embodiment.

At 228, Device A may take action to first ensure that the user's current active audio stream on headset 102 (if any) is handled appropriately, before instructing headset 102 to break its connection with Device B. For example, if Device A has a currently active audio stream (e.g., voice call or streaming music) via headset 102, Device A may suspend, terminate, or otherwise interrupt such audio stream. At 230, Device A may then break the current connection between headset 102 and Device B, e.g., to free up a connection spot for Device C to connect to headset 102. For example, in one embodiment, server 114 messages Device A to break the connection between headset 102 and Device B, Device A may then command headset 102 to break its connection with Device B, and headset 102 may then break the connection with Device B.

At 232, Device A and back-end server 114 may communicate to share relevant information, including (a) Device A updating server 144 with the current headset connection information stored in device data 186 (specifically, that headset is connected to Device A but no longer connected to B, such that server 144 can instruct headset 102 to connect to Device C to fill the open connection spot) and (b) server 114 providing Device A with any required telemetry data to proceed with the connection of Device C to headset 102, e.g., identification/address information for Device C. At 234, Device A instructs headset 102 to connect to Device C, e.g., based on Device C connection data 135 stored at headset 102 and/or headset connection data 157 stored at Device C. At 236, headset 102 communicates with Device C (e.g., exchanging keys or other connection data 135 and/or 157) to connect Device C to headset 102, and headset 102 (or Device C) may notify server 114 of the completed connection, such that server 114 may update device date 186 accordingly. At 238, server 114 may notify Device C to answer the Device C inbound call, and Device C then answers the call. At 240 the call audio is routed from Device C to headset 102 and vice versa. In this manner, the Device C inbound call is automatically answered at headset 102 in response to the user action/input performed at step 222.

FIG. 3 is a table 300 defining an example set of rules for selecting a particular user device to designate as the "connection control device" for facilitating the disconnection of a first, currently connected user device from a headset and connection of a second, currently non-connected user device to the headset, e.g., to answer a call incoming at the second user device, according to some embodiments of the present invention. For example, table 300 (or similar set of rules) may be used by server 114 at step 216 of process flow 200 (discussed above), by user devices 104 at step 514 of process flow 500A or 500B (discussed below), by server 114 at step 714 of process flow 700 (discussed below), by server 114 at step 822 or 882 of process flow 800 (discussed below), or by user devices 104 at step 848 of process flow 800 (discussed below). Table 300 shows rules for selecting a connection control device for four different scenarios 302, 304, 306, 308 ("headset states"), in an example situation in which a call is coming in on Device C while headset 102 (limited to two concurrent user device connections) is currently connected to Device A and Device B, but not Device C.

Figure 4:
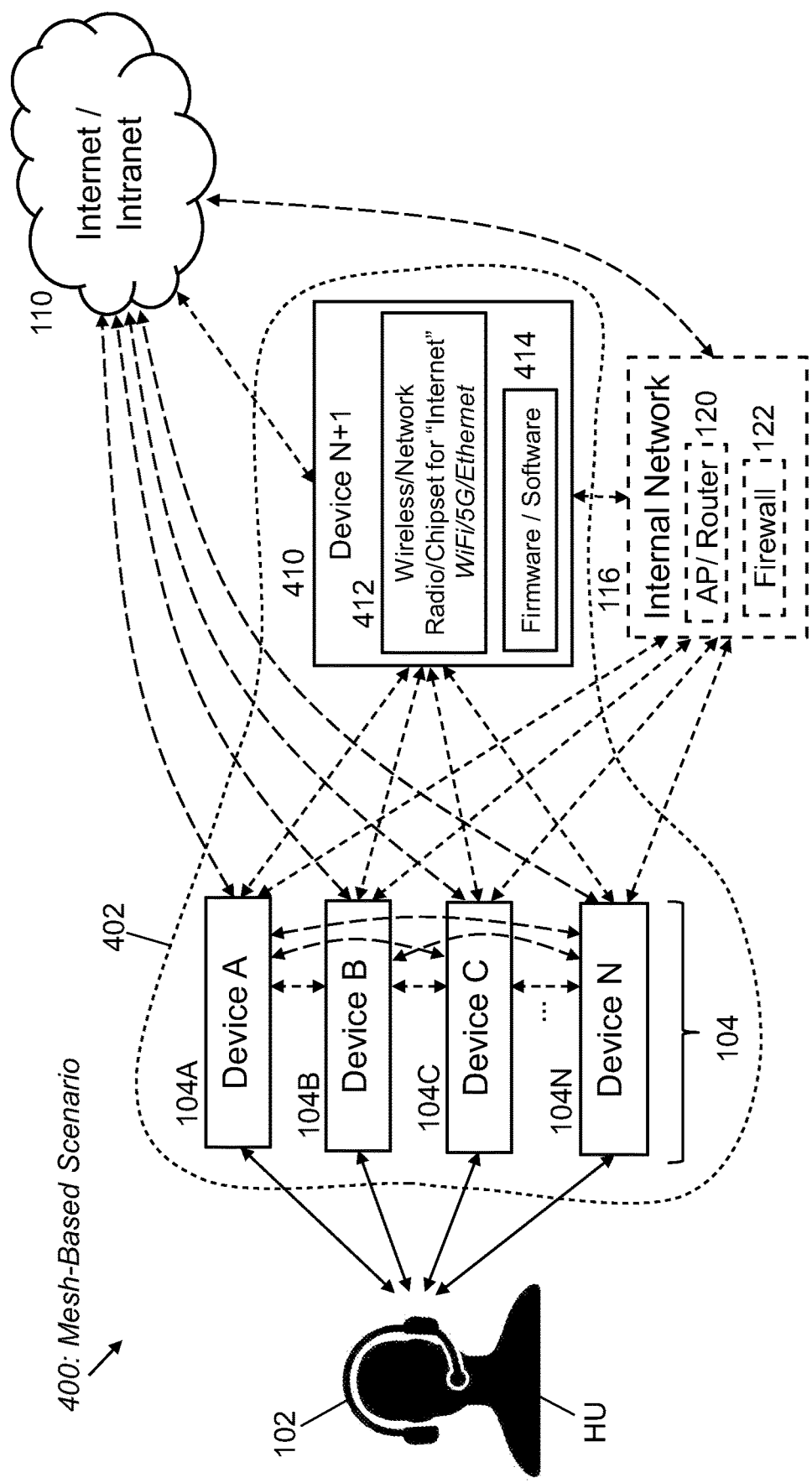
FIG. 4 illustrates an example system for a "mesh-based" implementation for managing connections between a headset and multiple user devices, e.g., to handle an inbound or outbound call, according to one example embodiment.
Figures 1, 5A:
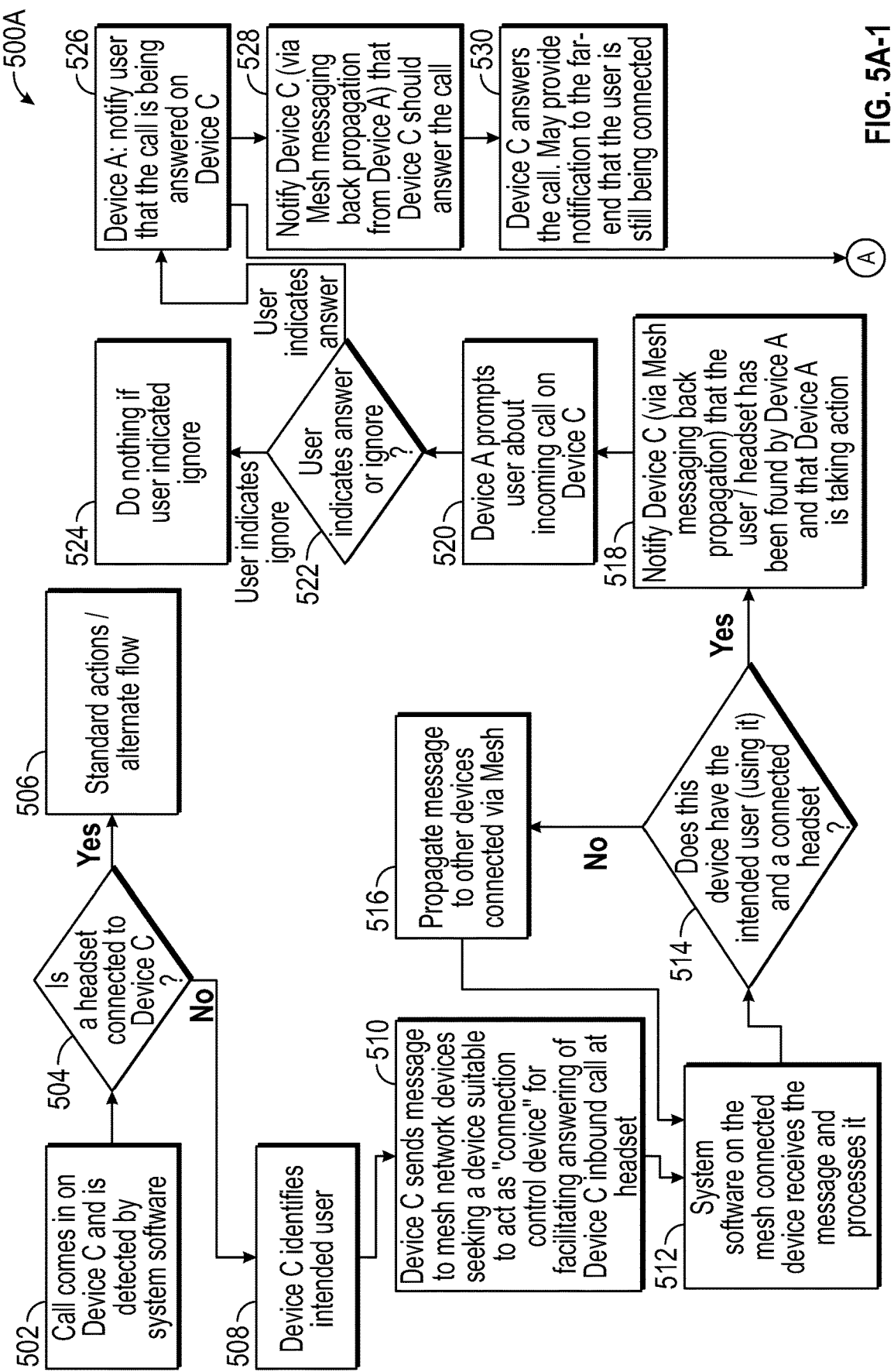
FIGS. 5A-1 and 5A-2 collectively show a flowchart of a first example process flow for a "mesh-based" implementation for managing connections between a headset and multiple user devices to handle an inbound call coming in at a non-connected user device, according to one example embodiment.

FIG. 4 illustrates an example system 400 for a "mesh-based" implementation for managing connections between a headset and multiple user devices, e.g., to handle an inbound or outbound call, according to one example embodiment of the present invention. FIGS. 5A-1/5A-2 and FIGS. 5B-1/5B-2 discussed below provide two example process flows 500A and 500B for mesh-based solutions that may be implemented by example system 400.

System 400 provides a "mesh-based" solution in that certain aspects of the solution are provided by a mesh network 402 local to the user HU, e.g., which mesh network 402 may involve one or more user device 104 and/or additional device(s) indicated at 410. The mesh-based solution may provide a full edge deployment, without requiring cloud-based communications with a back-end system 112. In addition to previous assumptions discussed above, the following capabilities of devices 104 and/or 410 included in mesh network 402 ("mesh network devices") are assumed: (i) mesh network devices 104, 410 are configured with mesh networking capabilities for networking with each other over any suitable existing or future wireless format; (ii) each mesh network device 104, 410 is (a) capable of relaying messages to any other device 104, 410 in mesh network 402, and (b) when receiving messages from other mesh network devices 104/410, capable of identifying the sending device 104/410 in order to send a response message along the same communication channel; and (iii) each mesh network device 104/410 is capable of relaying audio data from device to device over the mesh network 402 without introducing network issues that would cause that audio stream to become significantly degraded and unusable for the purposes of effective person-person communication during a call. Some of all of such functionality may be provided by suitable software components provided in mesh network devices 104, 410, e.g., connection management logic 160 provided at each user device 104.

FIGS. 5A-1/5A-2 and 5B-1/5B-2 provide flowcharts of two example process flows 500A and 500B for "mesh-based" implementations for managing connections between a headset and multiple user devices to handle an inbound call at a non-connected user device, according to one example embodiment. Process flows 500A and 500B provide example processes for handling a call coming in at Device C that is not currently connected to a headset, in particular to allow the headset user (the callee) to answer the call at her headset, either by connecting Device C to the headset or alternatively (if the headset cannot connect to Device C, e.g., where the devices are out of wireless range) to route the call to a device that is currently connected to the headset (e.g., Device A). In process flow 500A shown collectively in FIGS. 5A-1 and 5A-2, the headset attempts to connect to Device C only after Device C answers the incoming call (if the user HU indicates intent to answer the call), such that Device C "holds" the answered call during the headset connection process and then once connected to the headset, routes the call audio to the headset. Alternatively, in process flow 500A shown in FIGS. 5A-1/5A-2, Device C answers the incoming call only after the headset connects to Device C. Example processes 500A and 500B may be implemented by the example cloud-based system 400 shown in FIG. 4. Further, as with process 200 shown in FIG. 2A discussed above, the connections between the headset and relevant user devices (Devices A, B, and C) involved in each example process 500A and 500B, at the time of the inbound call to the non-connected device (Device C), is represented in FIG. 2A, for reference.

Referring first to FIG. 5A-1, at 502, a call comes in on Device C, which is detected by connection management logic 160 on Device C ("Device C inbound call"). At 504, connection management logic 160 determines if Device C is currently connected to a headset 102 for answering the Device C inbound call. If connection management logic 160 determines Device C is currently connected to a headset 102, the call may be answered at the headset 102 according to any suitable protocol at 506. Alternatively, if connection management logic 160 determines Device C is not connected to a headset 102, the method proceeds to 508, where Device C may identify the intended user for the incoming call (i.e., the callee), e.g., based on user currently logged into Device C, or the relevant soft-client on Device C (e.g., in the case of a laptop or desktop PC running a telephony client).

At 510, Device C initiates the process of identifying a "connection control device" capable of facilitating the answering of the Device C inbound call at headset 102. In one embodiment, Device C may generate and send out a message to mesh network 402 that includes (a) information needed by a receiving device 104, 410 to determine whether that device 104, 410 can act as the connection control device, e.g., (i) call information regarding the Device C inbound call and (ii) an identification of the intended user (callee); and (b) Device C identification information enabling the receiving device 104, 410 to message back to Device C (e.g., a unique identifier or other information identifying Device C). A first mesh network device 104, 410 receives and processes the message at 512.

The receiving mesh network device 104, 410 may then determine at 514 whether it can act as the connection control device, e.g., based on (a) whether the device 104, 401 has a required link or focus to the callee, e.g., whether the callee is logged into or currently using the respective device 104, 410 and (b) whether the device 104, 410 has a connected headset. If the receiving device 104, 410 determines it is not capable of acting as the connection control device (e.g., if either requirement (a) or (b) analyzed at 514 is not met), the device 104, 410 then forwards the request to other mesh network device(s) in the mesh network 402 at 516, and the method may return to step 512 for processing by such other mesh network device(s). When a particular device 104, 410 determines at 514 that it can act as the connection control device to facilitate the answering of the Device C inbound call at headset 102 (e.g., if both requirements (a) and (b) analyzed at 514 are met by the particular device 104, 410), the method proceeds to 518. In this example scenario, Device A determines it can act as the connection control device, and thus the method proceeds to 518 to begin control actions by Device A.

At 518, Device A notifies Device C, via mesh network messaging back-propagation, that headset 102 associated with the callee has been identified (by Device A) and that Device A is now taking further action (as the connection control device). This notification step may be important to avoid or handle a possible race condition; namely, in the event a second device 104, 410 also determines at 514 that it can act as the connection control device, and notifies Device C of such determination, Device C can inform the second device 104, 410 that Device A is already acting as the connection control device, such that the second device may yield to Device A.

At 520, Device A may prompt the user HU of the Device C inbound call, e.g., by outputting a visual, audible, and/or haptic notification (or sending a command to output such notification) at one or more of headset 102, Device A, Device B, or Device C, e.g., as discussed above regarding step 220 shown in FIG. 2A. At 522, user input may be received at any relevant device 102/104 in response to the call notification at 520, to indicate the user's intent for handling the incoming call, e.g., answering the call as a headset-supported call (with the call audio routed to headset 102), answering the call at Device C, ignoring the call, forwarding the call to voice mail, etc. For example, as discussed above regarding step 222 shown in FIG. 2A, the user HU may press a button on headset 102 indicating an intent to answer the call as a headset-supported call, or press a virtual button displayed on a touchscreen 162 of Device A, Device B, or Device C indicating an intent to answer the call as a headset-supported call, or press another displayed virtual button indicating an intent to ignore the call. Or, the user HU may elect to take no action, to thereby ignore the call.

If the user action (or lack of action) indicates an intent to ignore the call, the call is ignored at 524, and may roll to voice mail, depending on the configuration or settings at Device C. Alternatively, if the user action indicates an intent to answer the call as a headset-supported call (with call audio routed to headset 102), at 526 Device A may begin facilitating the process for answering the call on headset 102. As this process may require a noticeable time to complete, e.g., a delay of 2-7 seconds resulting largely from inherent latencies related to Bluetooth or the relevant wireless protocol(s) involved, at 526 Device A may notify the user HU that the Device C inbound call is being answered at the headset 102 and that there will be a short delay to complete the process, e.g., to avoid the user concluding the call answering process has failed and taking some action to terminate the call. Device A may provide such notification by outputting a visual or audible notification (or sending a command to output such notification) at one or more of headset 102, Device A, Device B, or Device C, e.g., depending on the particular embodiment.

At step 528 Device A may then instruct Device C, via mesh network messaging back-propagation, to answer the incoming call, e.g., so the call does not time out and roll to voicemail. In response, Device C answers the call at 530. In some embodiments, because the logistics of the switching/processing required for connecting Device C to headset 102 may take a few moments to complete (e.g., 2-8 seconds as discussed above), Device C may notify the far end caller (for example, via audio injected into the call) that the system is still connecting the callee to the call via the headset 102 (e.g., "Please wait a moment, your call is currently being connected to John Doe's headset").

At step 532, which may be performed simultaneous with step 528 and/or 530, Device A takes action to first ensure that the user's current active audio stream on the headset 102 is handled appropriately, before instructing the headset 102 to break its connection with Device B. For example, if Device A has a currently active audio stream (e.g., voice call or streaming music) via headset 102, Device A may suspend, terminate, or otherwise interrupt such audio stream at 532. At 534, Device A may break the current connection between headset 102 and Device B, e.g., to free up a connection spot for Device C to connect to headset 102. For example, Device A may send command(s) to headset 102 and/or Device B operable to break the connection between headset 102 and Device B.

At 536, Device A instructs headset 102 to connect to Device C, e.g., based on Device C connection data 135 stored at headset 102 and/or headset connection data 157 stored at Device C. At 538, headset 102 determines whether it can connect to Device C, e.g., if headset 102 is within wireless communication range of Device C. If so, headset 102 connects to Device C at 540, e.g., using Device C connection data 135 stored at headset 102 and/or headset connection data 157 stored at Device C. With Device C now connected to headset 102, Device C begins to route the call audio to headset 102 at 542. In this manner, the Device C inbound call is automatically answered at headset 102 in response to the user action/input performed at step 522.

Returning to decision step 538, if headset 102 cannot connect to Device C (e.g., if headset 102 is out of wireless communication range from Device C), Device A may take alternative actions. For example, Device A may attempt to route the Device C inbound call to headset 102 via Device A. First, at 544 Device A may instruct Device C, via mesh network messaging back-propagation, to attempt to relay the call audio to Device A via mesh network 402 (there may be one or more intermediate devices 104, 410 involved in the audio relay as an inherently aspect of mesh network 402). If the audio is able to be successfully relayed (as determined at 546), at 548 the Device C inbound call is answered at Device C, and the call audio is relayed to Device A (via mesh network 402) and further relayed to headset 102 via the existing active connection between headset 102 and Device A, such that the user (callee) may answer and engage in the call via headset 102.

If the audio is not able to be relayed from Device C to Device A via mesh network 402, at 550 Device A may notify the callee (e.g., via an audible or visual notification output at Device A and/or headset 102) of the failure to route the call audio to headset 102, and at 552 Device A may prompt the callee (e.g., via an audible or visual prompt at Device A and/or headset 102) for user input indicating whether to (a) terminate the Device C inbound call and end the process flow or (b) terminate the Device C inbound call and initiate a call back from Device A. At 554, input regarding such option may be received (or no input may be received) from the callee (e.g., via a user interface, e.g., button, switch, or touchscreen, at Device A and/or headset 102) that indicates whether to (a) end the Device C inbound call or (b) end the Device C inbound call and initiate a call back from Device A.

If the user input from the callee indicates to terminate the Device C inbound call and initiate a call back from Device A, the method proceeds to 556A. At 556A, Device A may send Device C, via mesh network messaging back-propagation: (a) a message for Device C to forward to the far end party (caller) indicating the near end party's (user HU's) intent to return the call, from Device A rather than Device C; (b) a request for Device C to provide relevant call-back details for calling the far end party (e.g., a phone number for a mobile phone, a URL for a soft phone client (e.g., Zoom, MS Teams, etc.), or a Sessions Initiation Protocol (SIP) link for an open standards device 104); and (c) a command for Device C to end the call. The message forwarded to the far end party by Device C, indicating the near end party's (user HU's) intent to return the call from Device A, may identify the phone number or other identification information of Device A, such that the far end party may identify the return call, e.g., based on caller ID or similar feedback displayed to the far end party. Such message may be a stock, pre-recorded message, or may be a customized voice message recorded by user HU at 556A.

At 558, Device C may send Device A the requested call-back details for calling the far end party (e.g., phone number, URL, or SIP link associated with the far end party), which information may have been collected by Device C during processing of the Device C inbound call. At 560 (which may be performed in parallel with step 558), Device C may end the call (which was answered at 530) in response to the instruction received from Device A at 556A. At 562, Device A, after obtaining the relevant call-back details from Device C at 558, may automatically initiate a call the far end party. The call audio may be automatically routed to the headset 102 via the active connection between Device A and headset 102. At 564, if the call is answered by the far end party, user HU is connected to the call audio at the headset 102, via Device A.

Returning to step 554, if the input (or lack of input) from user HU indicates an intent to end the Device C inbound call and not initiate a call back, the method proceeds to 566. At 566, Device A may send Device C, via mesh network messaging back-propagation, (a) a message for Device C to forward to the far end party (caller) indicating the near end party's failure or answer, or intent not to answer, the far end party's call, and (b) a command for Device C to end the call. The message forwarded to the far end party by Device C may be a stock, pre-recorded message, or may be a customized voice message recorded by user HU at 566. At 568, Device C ends the call (which was answered at 530) in response to the instruction from Device A at 566.

Figures 2, 5A:
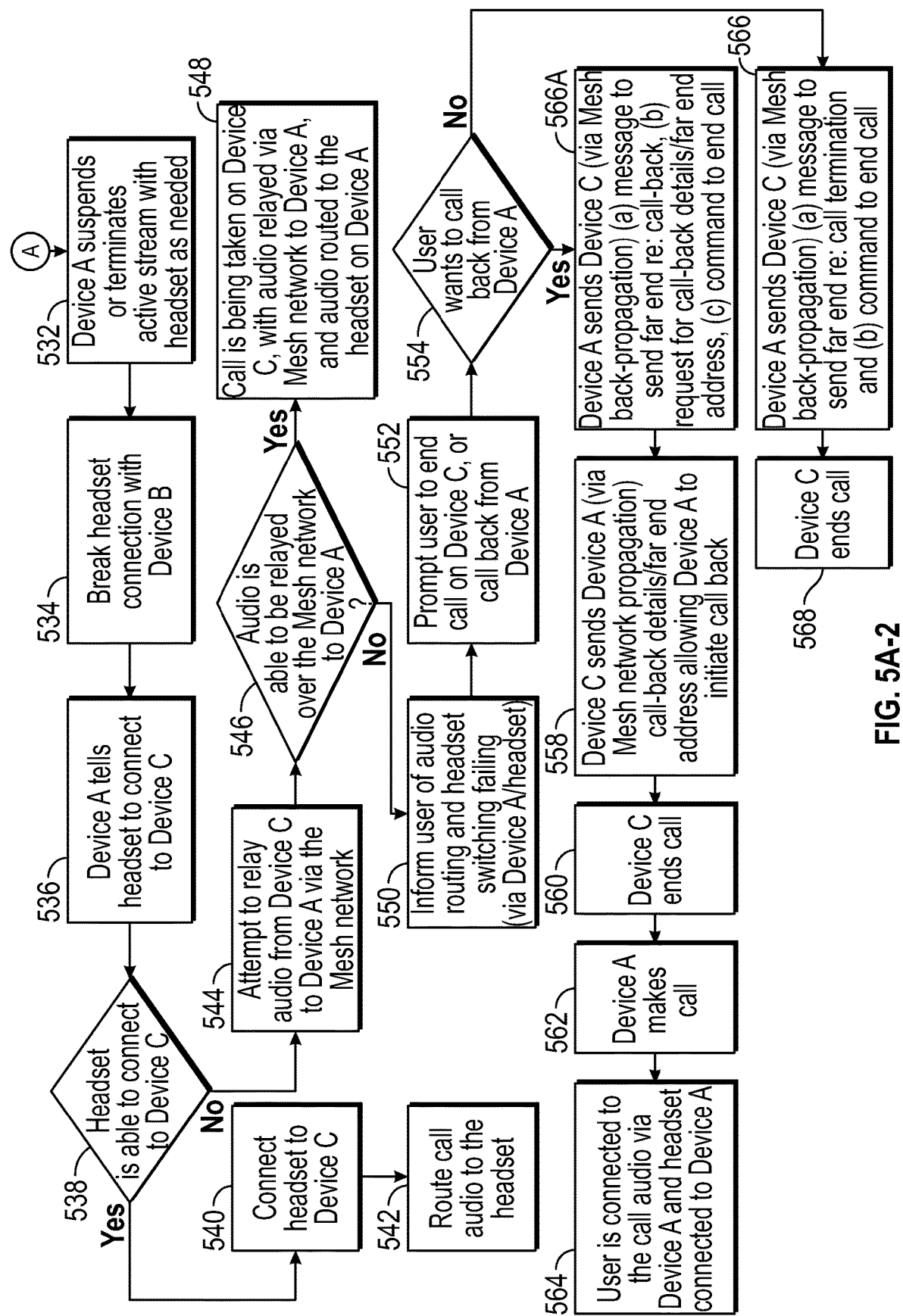
Figures 1, 5B:
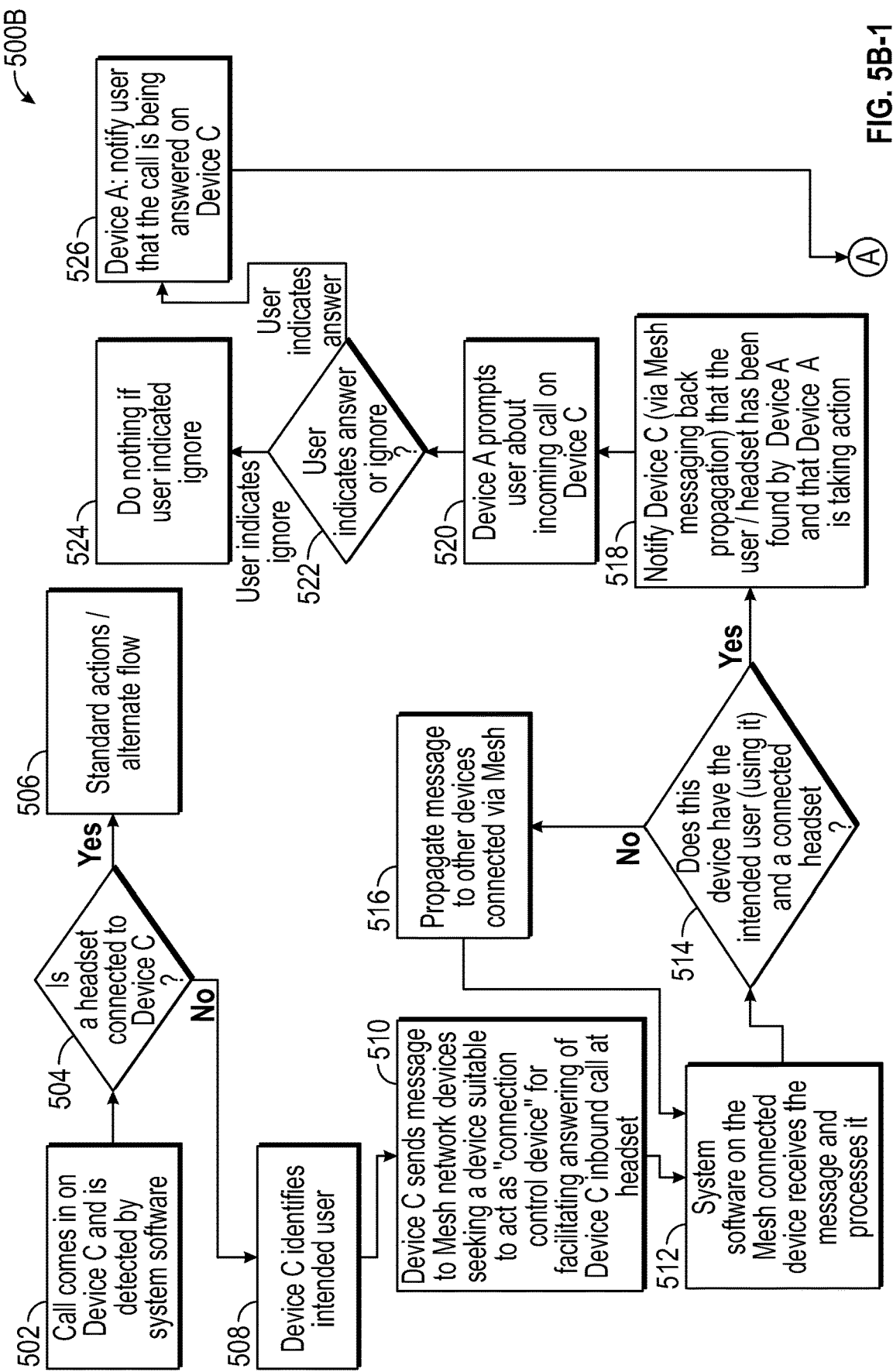
Figures 2, 5B:
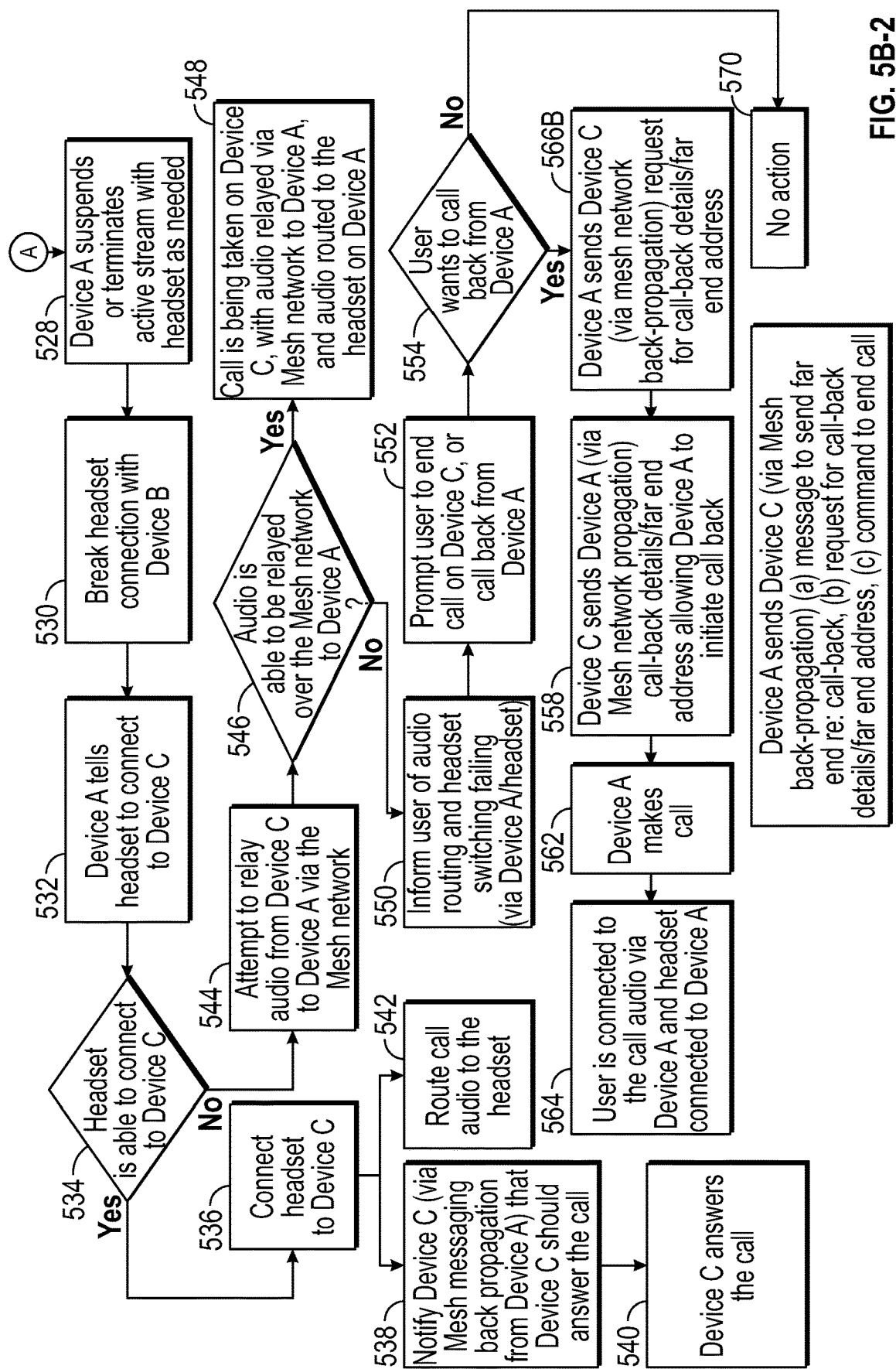

Referring now to FIGS. 5B-1/5B-2, process flow 500B is similar to process flow 500A shown in FIGS. 5A-1/5A-2, but unlike in process flow 500A, Device C answers the incoming call only after the headset connects to Device C. Steps 502-522 of process flow 500B, which covers the process up through the user input indicating the user's intent regarding the Device C inbound call, are the same as steps 502-522 of process flow 500A, after which the process flows depart.

As discussed above, in process flow 500A, after the user signals her intent (at step 522) to answer the Device C inbound call, Device C answers the call and both parties (far-end caller and near-end callee) are informed (at steps 526, 530) that the call is being answered/connected to the callee's headset, and to expect a brief delay for such process to complete before call audio can be routed to the headset. In contrast, in process flow 500A, after the user signals her intent (at step 522) to answer the Device C inbound call, the process proceeds to connect Device C to the headset 102, by (a) suspending any active stream from Device A to headset 102 at step 528, (b) disconnecting Device B from headset 102 at step 532, and (c) connecting Device C to headset 102 at step 536 (unless it is determined at 534 that headset is unable to connect to Device C). After connecting Device C to headset 102 at step 536, Device A (connection control device) may then instruct Device C, via mesh network messaging back-propagation, to answer the incoming call, and Device C may then answer the call at 540. Device C may begin routing the call audio to headset 102 at 542, which may be initiated after, or simultaneous with, step 538 and/or 540. In this manner, the Device C inbound call is automatically answered at headset 102 in response to the user action/input performed at step 522.

Alternatively, if it is determined at 534 that headset is unable to connect to Device C (e.g., if headset 102 is out of wireless communication range from Device C), Device A may attempt to route the Device C inbound call to headset 102 via Device A, e.g., as discussed above with respect to process flow 500A shown in FIGS. 5A-1/5A-2. The process flow steps for attempting to route the Device C inbound call to headset 102 via Device A are similar to those discussed above regarding process flow 500A, with a few notable differences. First, First, if the user signals an intent at 554 to call back the far end party (caller) from Device A, the messaging performed at step 556B is different than at the corresponding step 556A of process flow 500A discussed above. In particular, at 556B, Device A may send Device C, via mesh network messaging back-propagation, a request for Device C to provide relevant call-back details for calling the far end party (e.g., a phone number for a mobile phone, a URL for a soft phone client (e.g., Zoom, MS Teams, etc.), or a Sessions Initiation Protocol (SIP) link for an open standards device 104). Unlike step 556A of process flow 500A, step 556B of process flow 500B may omit a message for Device C to forward to the far end party (caller) indicating the near end party's (user HU's) call-back intention, as Device C has not answered the incoming call and thus such call connection is not available for forwarding such message to the far end party. Further, unlike step 556A, step 556B may omit the command from Device A to Device C to end the call, as Device C has not answered the call in this scenario in process flow 500B. Another difference of process flow 500B from process flow 500A is that if the user input (or lack of input) at 554 indicates an intent not to call back the far end party (caller), no automated action is taken by the system, as indicated at 570; unlike in process flow 500A, Device C has not answered the call and thus steps 566-568 of process flow 500A are not relevant to process flow 500B.

FIG. 6 illustrates an example system 400 for a "hybrid cloud/mesh" implementation for managing connections between a headset and multiple user devices, e.g., to handle an inbound or outbound call, according to one example embodiment of the present invention. System 600 provides a "hybrid cloud/mesh" solution in that (a) some aspects of the solution (e.g., process steps) are provided by a cloud network, e.g., a back-end network 112 including back-end server(s) 114, discussed above, and (b) other aspects of the solution (e.g., process steps) are provided by a local mesh network 402, e.g., involving user device(s) 104 and/or additional device(s) 410. Thus, the example hybrid cloud/mesh system 600 shown in FIG. 6 may represent a merger or blend of the example "cloud-based" system shown in FIG. 1A and the example "mech-based" system shown in FIG. 4.

Figures 1, 7:
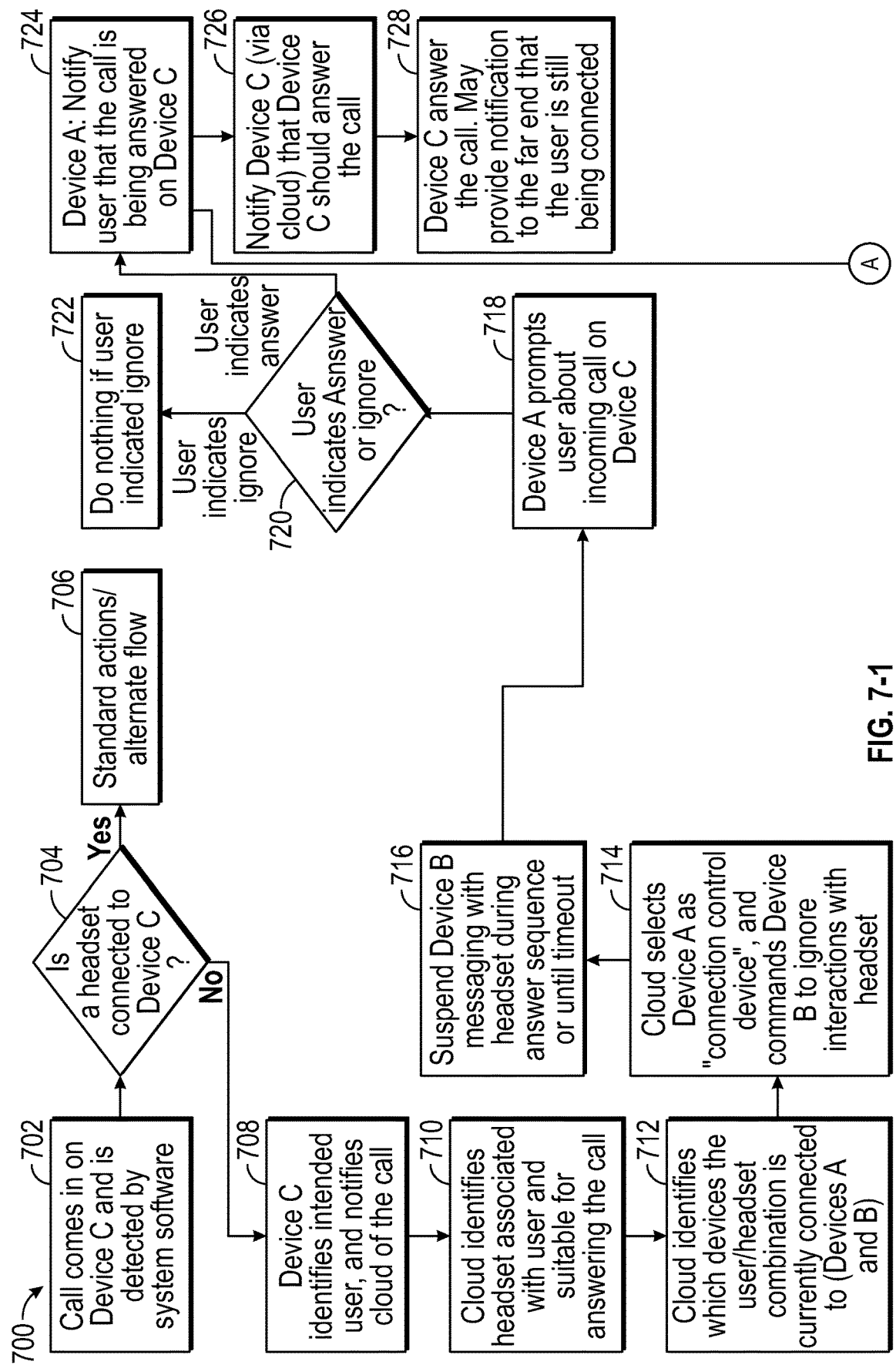
Figures 2, 7:
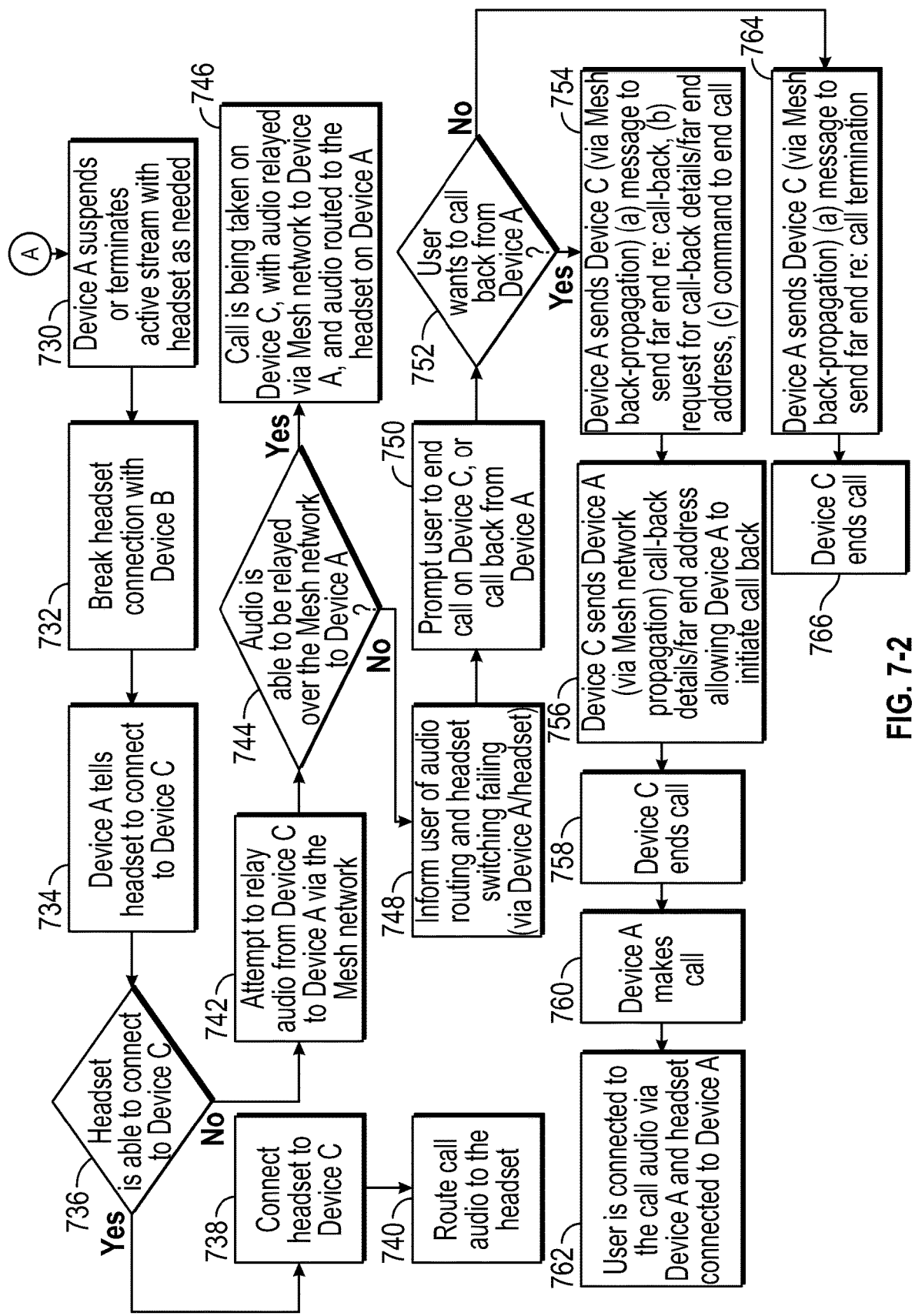
Figures 1, 8:
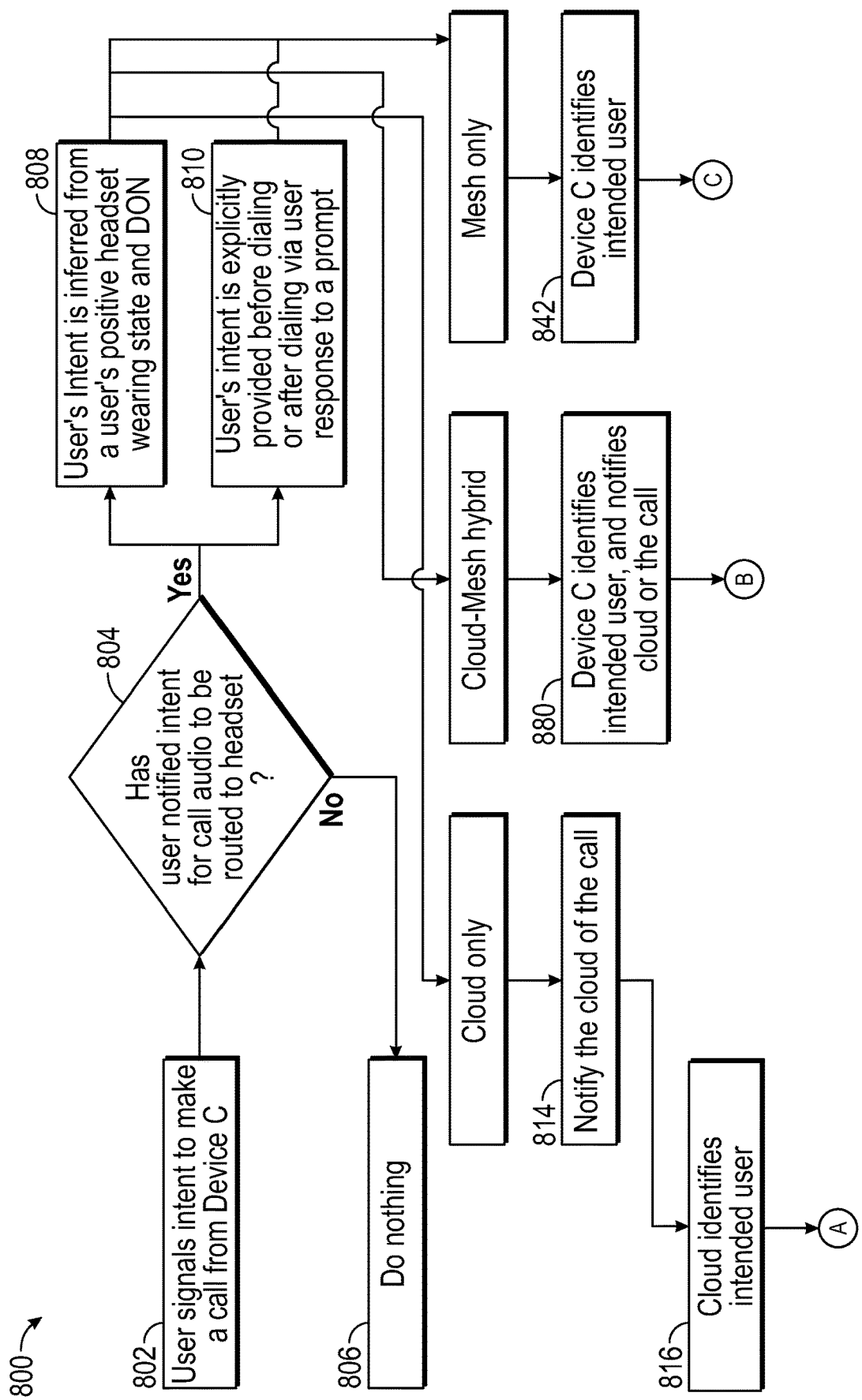
Figures 2, 8:
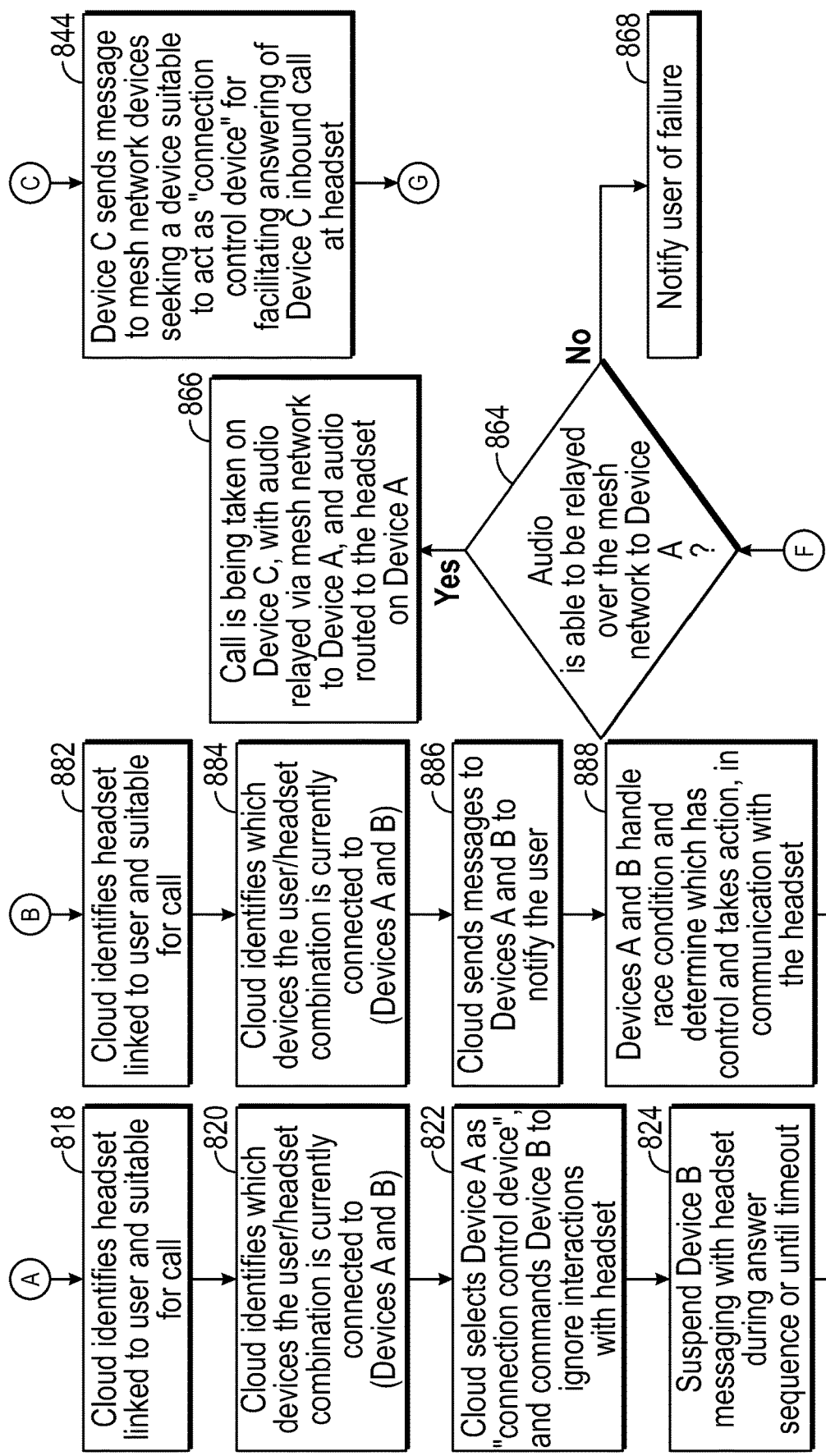
Figure 9:
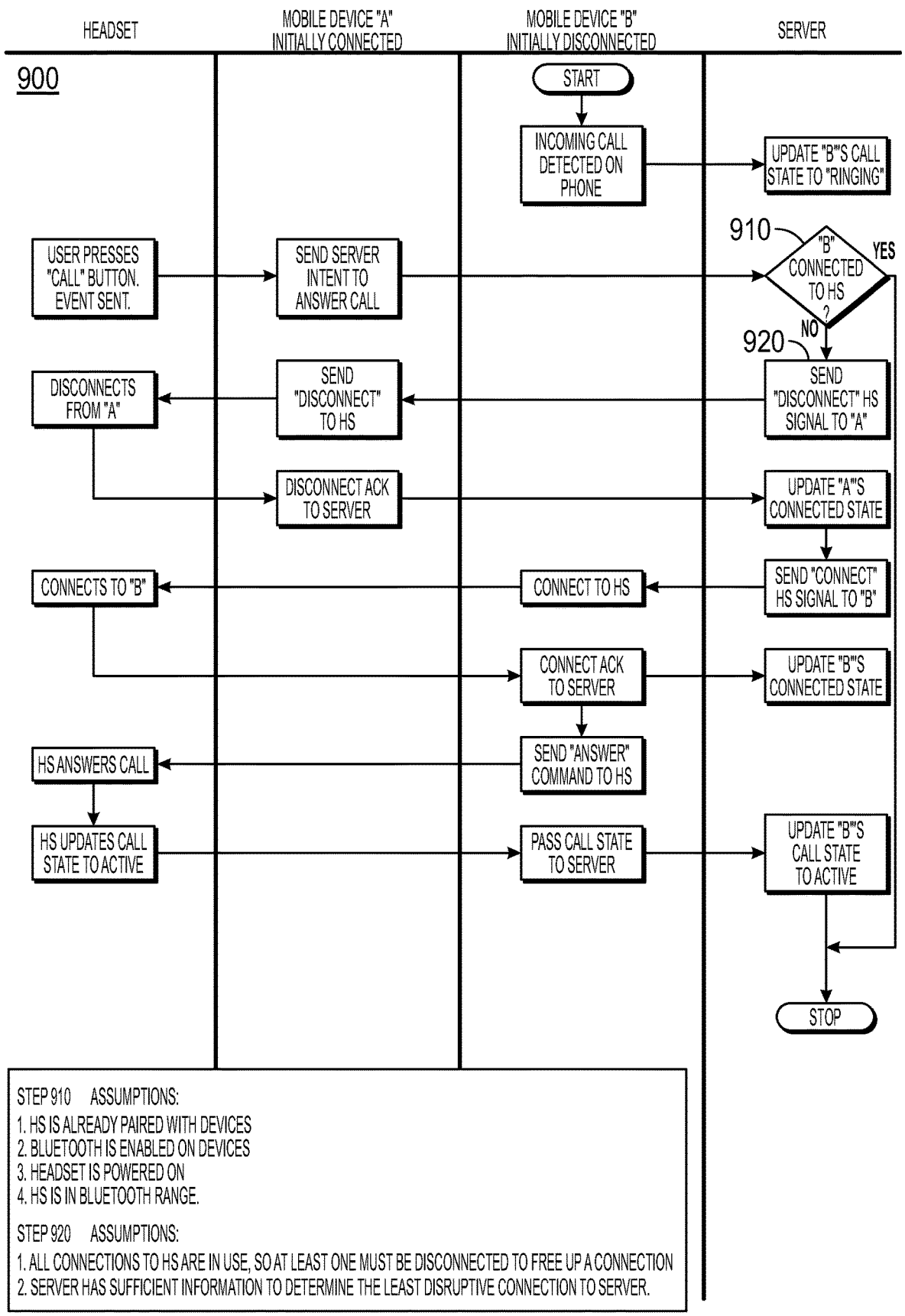
FIGS. 9-17 show flowcharts of process flows for various alternative implementations for managing connections between a headset and multiple user devices to handle an inbound call coming in at a non-connected user device, according to example embodiments.
Figure 10:
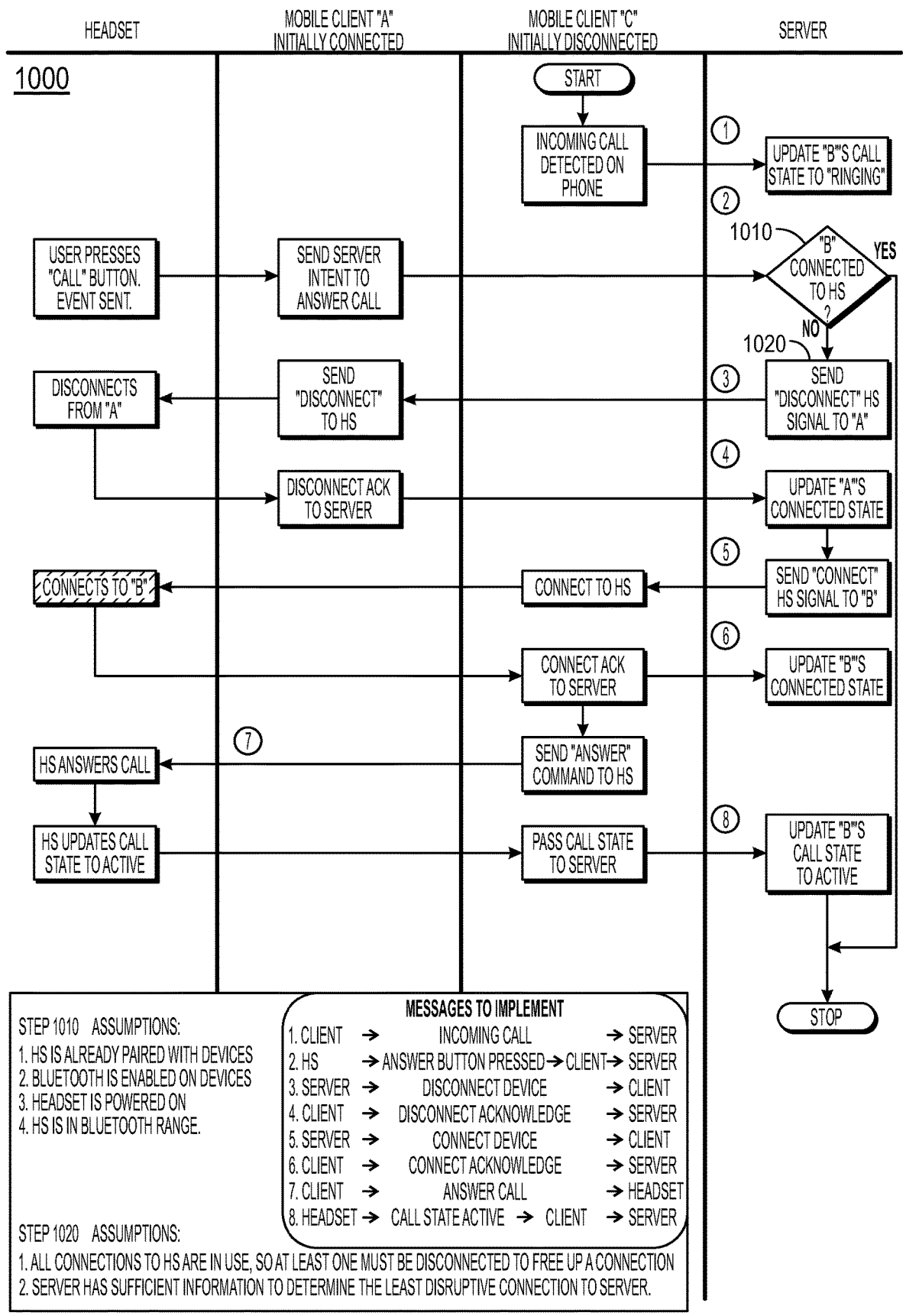
Figure 11:
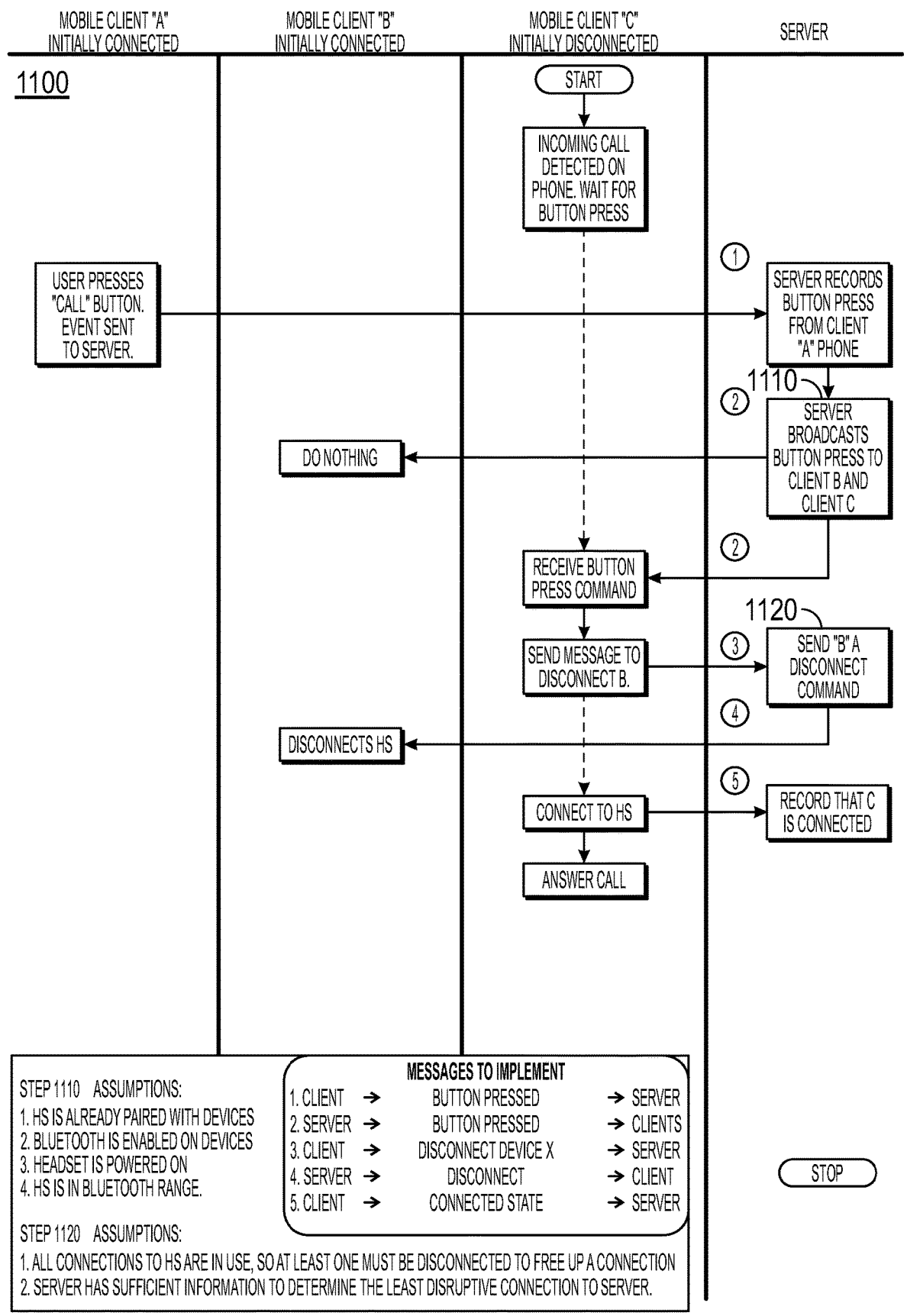
Figure 12:
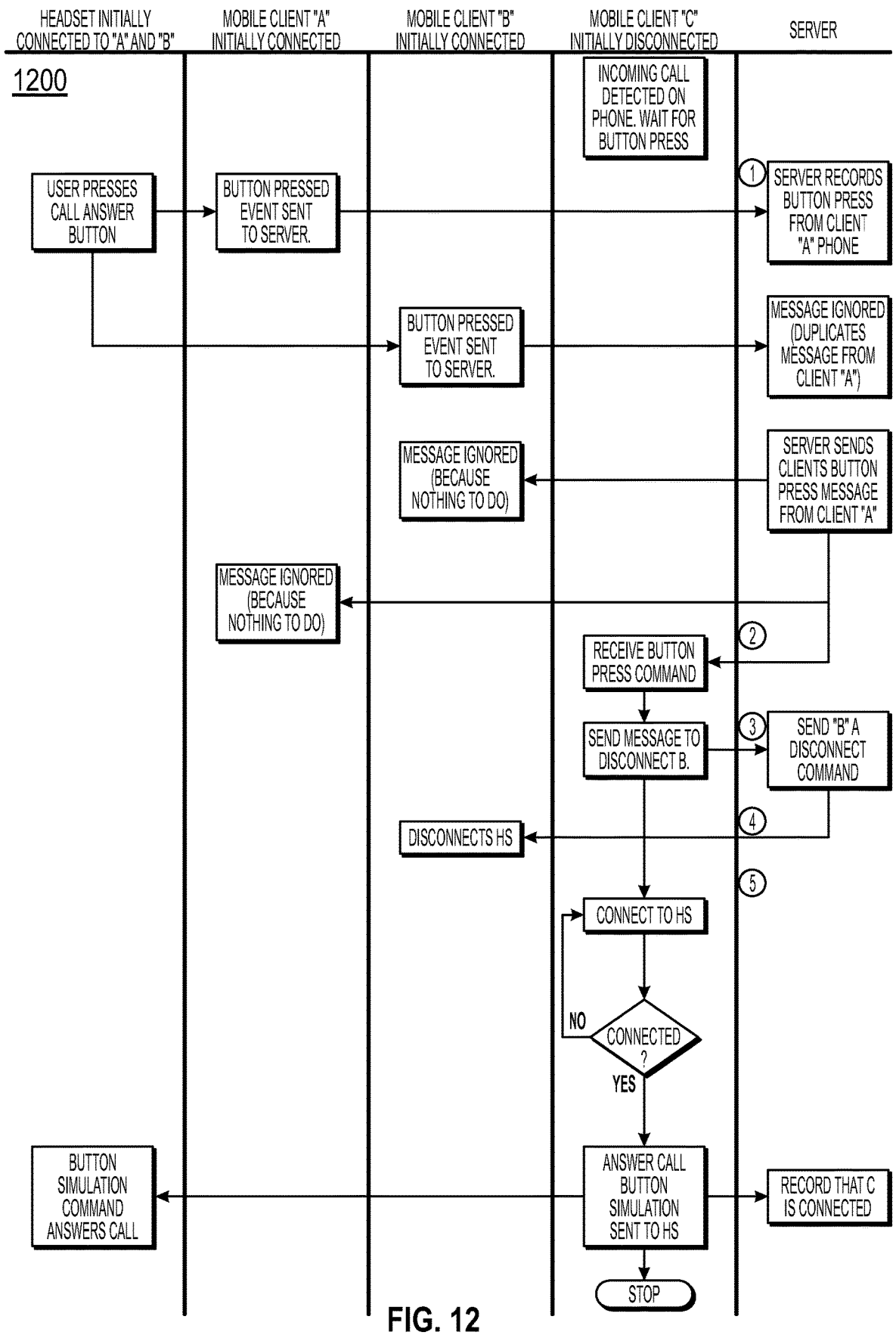
Figure 13:
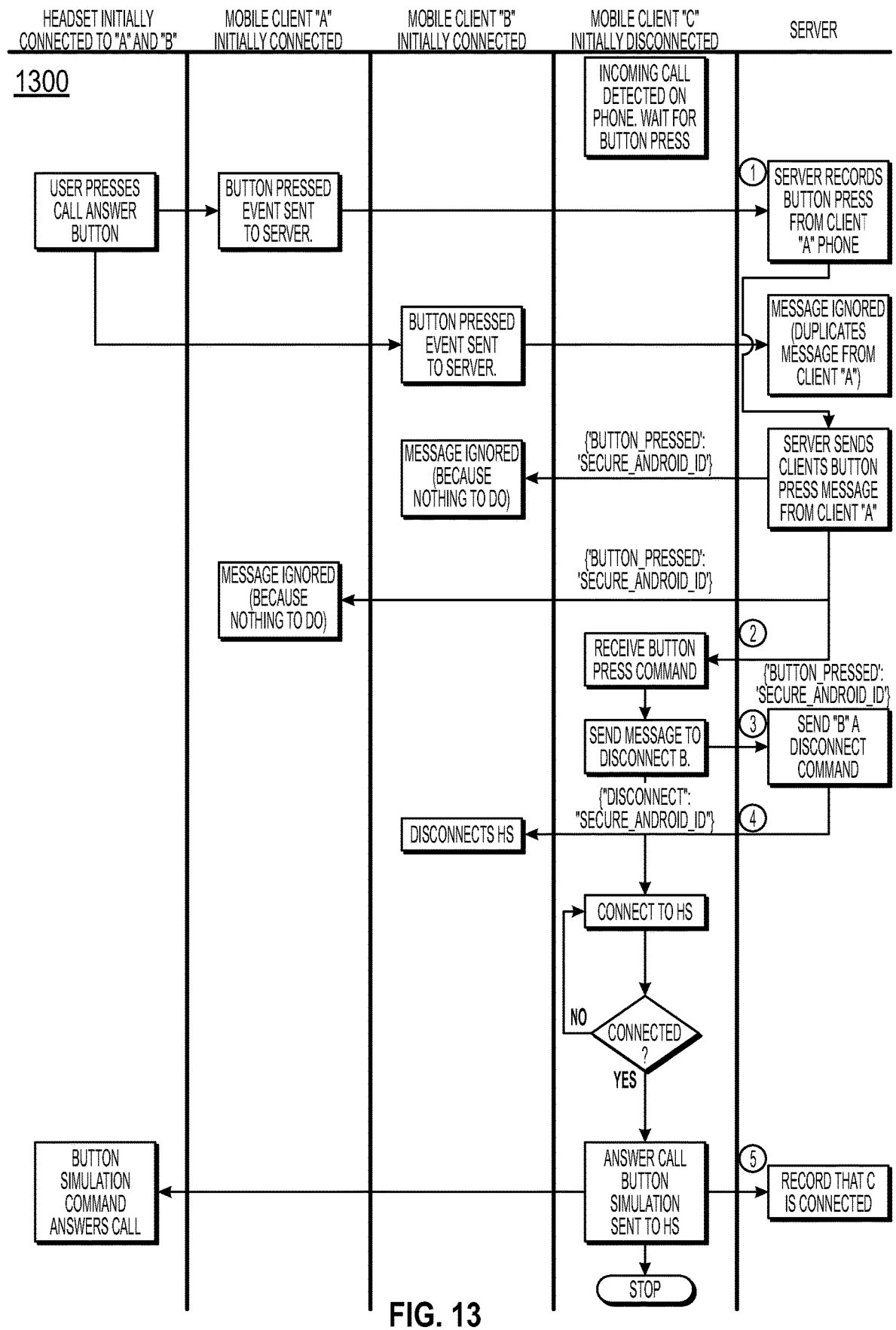
Figure 14:
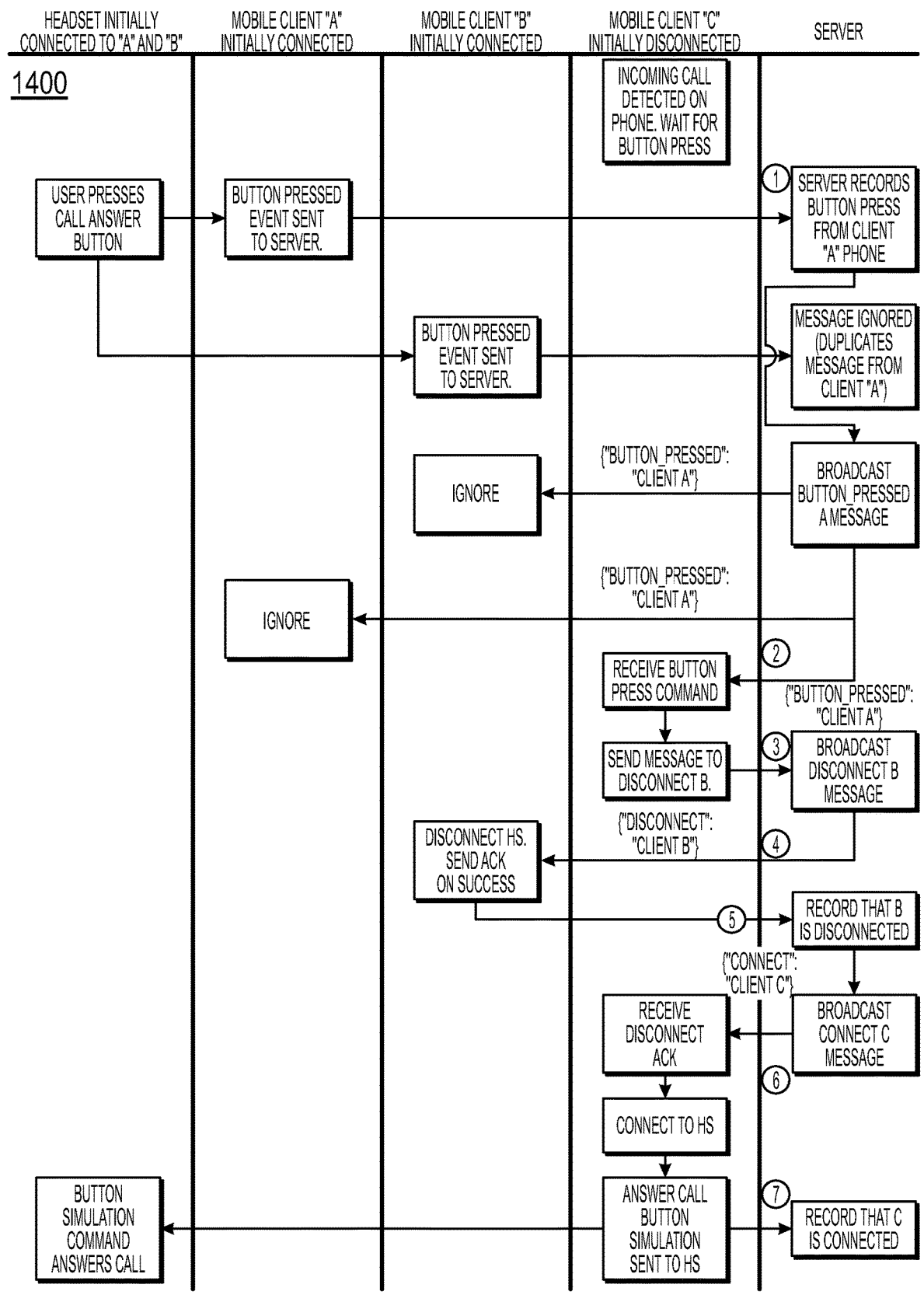
Figure 15:
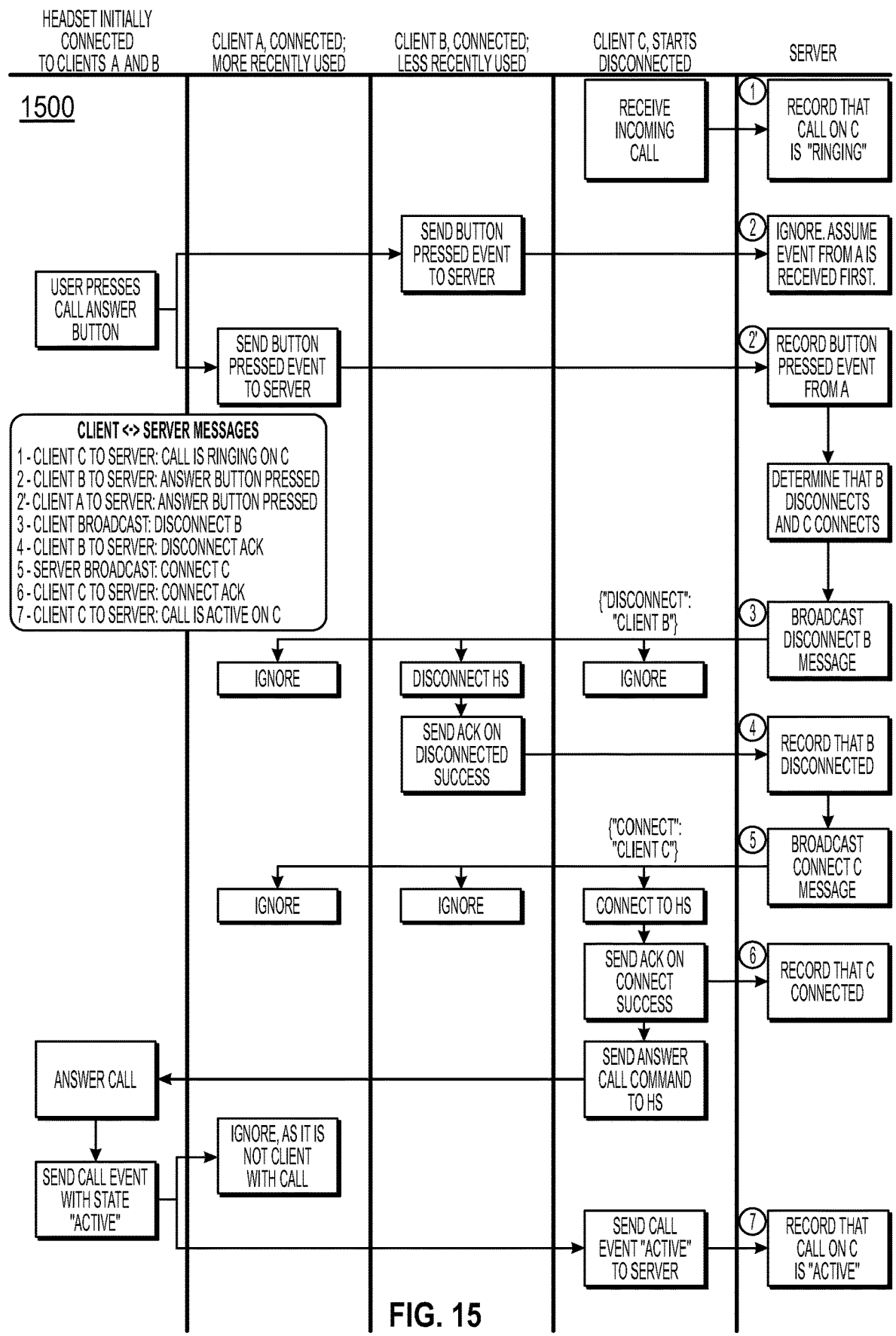
Figure 16:
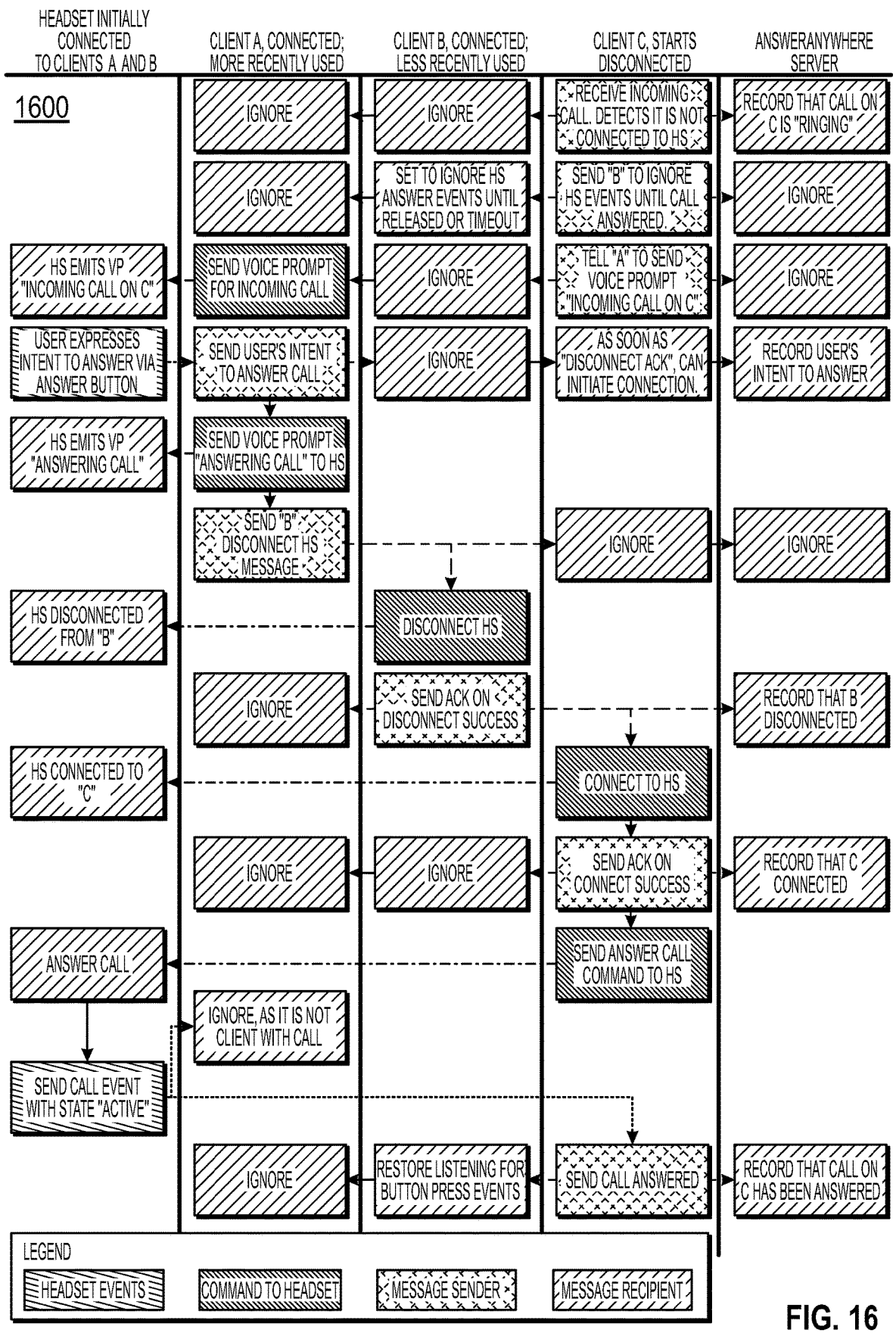
Figure 17:
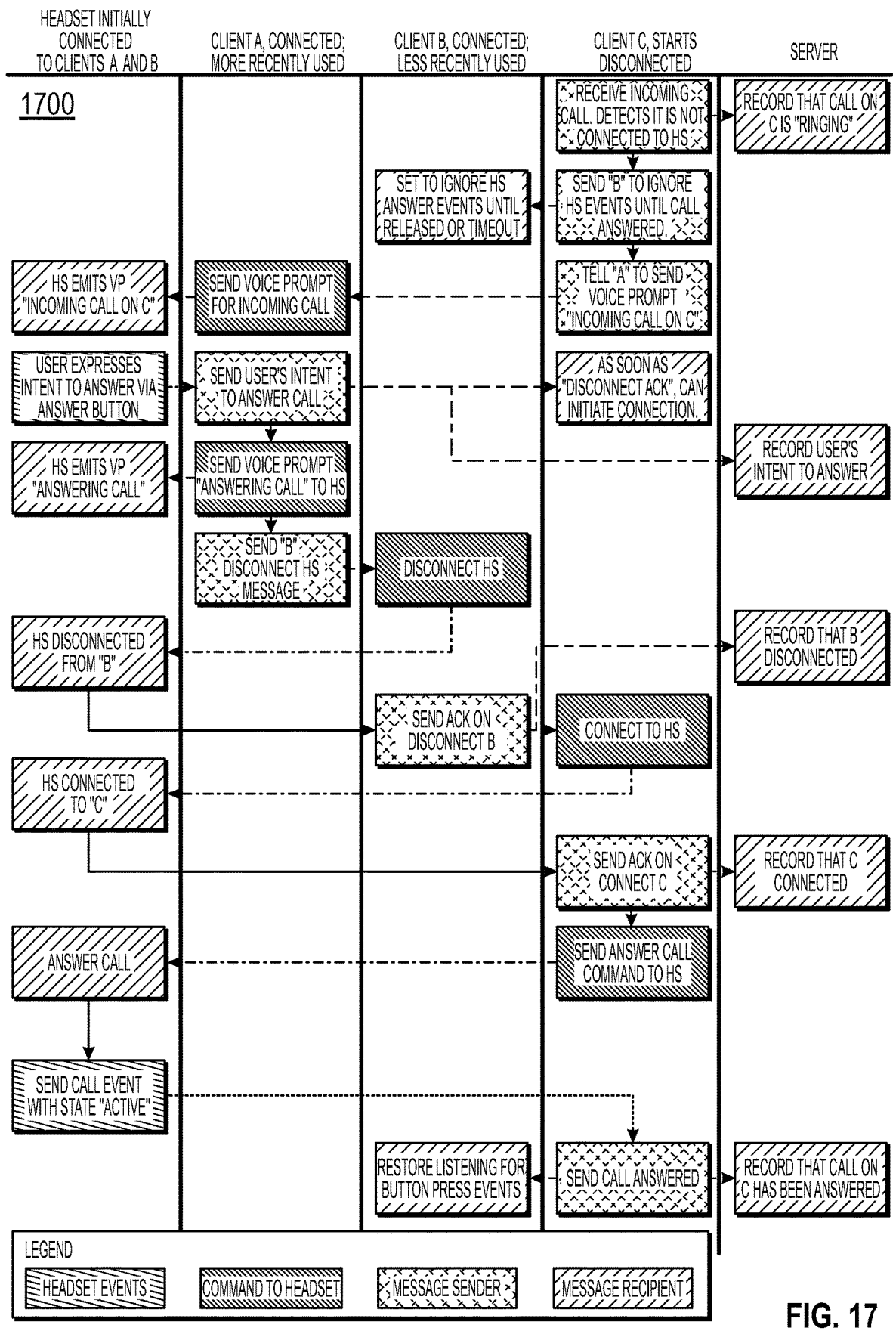

FIGS. 7-1 and 7-2 collectively show a flowchart of an example process flow 700 for a "hybrid cloud/mesh" implementation for managing connections between a headset and multiple user devices to handle an inbound call at a non-connected user device, according to one example embodiment. Example process 700 may be implemented by the example cloud-based system 600 shown in FIG. 6. Some process steps of process flow 700 are performed or facilitated by a back-end network 112 including back-end server(s) 114 (cloud network), while other process steps of process flow 700 are performed or facilitated by local mesh network 402. Thus, hybrid cloud/mesh process flow 700 shown in FIGS. 7-1/7-2 may represent a merger or blend of the example "cloud-based" process flow shown in FIG. 2A and the example "mesh-based" process flows shown in FIGS. 5A-1/5A-2 or FIGS. 5B-1/5B-2. In general, the hybrid process flow 700 utilizes the cloud (e.g., back-end server 114) for messaging and orchestration of actions, and utilizes the mesh network 402 for audio relay solutions. Further, as with examples processes 200, 500A, and 500B discussed above, the connections between the headset and relevant user devices (Devices A, B, and C) involved in example process 700, at the time of the inbound call to the non-connected device (Device C), is represented in FIG. 2A, for reference.

At 702, a call comes in on a particular user device 104 associated with user HU, namely Device C, which is detected by connection management logic 160 on Device C ("Device C inbound call"). At 704, connection management logic 160 determines if Device C is currently connected to a headset 102 for answering the Device C inbound call. If connection management logic 160 determines Device C is currently connected to a headset 102, the call may be answered at the headset 102 according to any suitable protocol at 706. Alternatively, if connection management logic 160 determines Device C is not connected to a headset 102, it notifies the cloud (in this example, back-end server 114) of the Device C inbound call at 208. At 710, server 114 may identify a particular headset 102 for answering the Device C inbound call, e.g., based on which headset 102 associated with the user HU (if multiple) is currently in use by the user (e.g., based on the donned/doffed status of each headset) and/or the user's headset preferences (if any), e.g., based on stored device data 186.

At 714, server 114 may identify, e.g., based on stored device data 186, which user devices 104 are currently connected (i.e., active connections) to the headset 102 identified at 212. In this example, server 114 determines Device A and Device B are currently connected to the headset 102. At 714, server 114 may select and designate a particular user device 104—in this example, Device A—as a "connection control device" for performing control/notification actions (e.g., interacting with headset 102) during subsequent steps, e.g., as discussed above regarding step 216 of method 200.

Upon being designated as the connection control device, at 716 Device A may instruct other user devices, including Device B, to interrupt messaging between Device B and headset 102 going forward, which may involve (a) suppressing messaging but maintaining the connection between Device B to headset 102, e.g., for the event in which the user chooses to ignore the Device C inbound call at 720 (wherein messaging between Device B and headset 102 may be easily restored without needing to reconnect Device B), or (b) actually disconnecting Device B from headset 102 at this point.

At 718, Device A may prompt the user HU of the Device C inbound call, e.g., by outputting a visual, audible, and/or haptic notification (or sending a command to output such notification) at one or more of headset 102, Device A, Device B, or Device C, e.g., depending on the particular embodiment, system settings, and/or call management settings at each respective device 102/104, and may request user input to indicate the user's intent for handling the incoming call, e.g., as discussed above regarding step 220 of method 200.

At 720, user input may be received at any relevant device 102/104 in response to the call notification output at 220, to indicate the user's intent for handling the incoming call, e.g., as discussed above regarding step 222 of method 200. If the user action (or lack of action) indicates an intent to ignore the call, the call is ignored at 722, which may roll to voice mail (depending on the configuration or settings at Device C), and the headset 102 remains connected to Devices A and B, and the message suppression of Device B (initiated at 218) may be cancelled. Alternatively, if the user action indicates an intent to answer the call as a headset-supported call (with call audio routed from Device C to headset 102), at 724 Device A may begin facilitating the process for answering the call on headset 102. As this process may require a noticeable time to complete, e.g., a delay of 2-7 seconds resulting largely from inherent latencies related to Bluetooth or the relevant wireless protocol(s) involved, at 724 Device A may notify the user HU that the Device C inbound call is being answered at the headset 102, e.g., as discussed above regarding step 226 of method 200.

At 726, server 114 may then instruct Device C to answer the incoming call, e.g., so the call does not time out and roll to voicemail. In response, Device C answers the call at 728. In some embodiments, because the logistics of the switching/processing required for connecting Device C to headset 102 may take a few moments to complete (e.g., 2-8 seconds as discussed above), Device C may notify the far end caller that the system is still connecting the callee to the call via the headset 102 (for example, "Please wait a moment, your call is currently being connected to John Doe's headset"), e.g., as discussed above regarding step 530 of process flow 500A.

At step 730, which may be performed simultaneous with step 726 and/or 728, Device A takes action to first ensure that the user's current active audio stream on the headset 102 is handled appropriately, before instructing the headset 102 to break its connection with Device B. For example, if Device A has a currently active audio stream (e.g., voice call or streaming music) via headset 102, Device A may suspend, terminate, or otherwise interrupt such audio stream at 730. At 732, Device A may break the current connection between headset 102 and Device B, e.g., to free up a connection spot for Device C to connect to headset 102. For example, server 114 messages Device A to break the connection between headset 102 and Device B, Device A may then command headset 102 to break its connection with Device B, and headset 102 may then break the connection with Device B.

At 734, Device A instructs headset 102 to connect to Device C, e.g., based on Device C connection data 135 stored at headset 102 and/or headset connection data 157 stored at Device C. At 736, headset 102 determines whether it can connect to Device C, e.g., if headset 102 is within wireless communication range of Device C. If so, headset 102 connects to Device C at 738, and Device C begins to route the call audio to headset 102 at 740, e.g., as discussed above regarding steps 540-542 of process flow 500A. In this manner, the Device C inbound call is automatically answered at headset 102 in response to the user action/input performed at step 720.

Returning to decision step 736, if headset 102 cannot connect to Device C (e.g., if headset 102 is out of wireless communication range from Device C), Device A may take alternative actions. For example, Device A may attempt to route the Device C inbound call to headset 102 via Device A, using mesh connections between Device C and Device A. First, at 742 Device A may instruct Device C, via mesh network messaging back-propagation, to attempt to relay the call audio to Device A via mesh network 402 (there may be one or more intermediate devices 104, 410 involved in the audio relay as an inherently aspect of mesh network 402). If the audio is able to be successfully relayed (as determined at 744), at 746 the Device C inbound call is answered at Device C, and the call audio is relayed to Device A (via mesh network 402) and further relayed to headset 102 via the existing active connection between headset 102 and Device A, such that the user (callee) may answer and engage in the call via headset 102.

If the audio is not able to be relayed from Device C to Device A via mesh network 402, the process flow may continue to steps 748-766 for the option of initiating a call back to the far end party (caller) from Device A, which process is described above with respect to steps 550-568 of process flow 500A.

FIGS. 8-1, 8-2, and 8-3 collectively show a flowchart of an example process flow 800 for managing connections between a headset and multiple user devices to handle an outbound call at a currently non-connected user device, according to one example embodiment. Process flow 800 includes three optional paths: (1) a first path (starting at step 814) for a cloud-based implementation, e.g., performed by system 100 shown in FIG. 1, (2) a second path (starting at step 842) for a mesh-based implementation, e.g., performed by system 400 shown in FIG. 4, and (3) a third path (starting at step 880) for a hybrid cloud/mesh implementation, e.g., performed by system 600 shown in FIG. 6, according to example embodiments.

At 802, user HU signals an intent, by a defined user input or interaction with a selected device (e.g., Device C or other device 102, 104) to make a call from Device C, which is not currently connected to headset 102, e.g., according to the other example scenarios discussed above. At 804, the system (e.g., the device 102, 104 which the user interacted at 802) may determine whether the user intends the call audio to be routed to headset 102, which may be (a) inferred if the user HU is currenting wearing the headset 102 on dons the headset within a defined time after signaling the intent to make the call at 802, e.g., as detected automatically by a don/doff sensor 144 in headset 102, as indicated at 808, or (b) explicitly determined based on a defined user input or device interaction by user HU, e.g., in response to a relevant prompt presented to the user, as indicated at 810. The system may be configured to detect either or both of the inferred intent at 808 or the explicit intent at 810, depending on the particular embodiment or device configurations.

In the system does not detect a user intent to route the call audio to headset 102, the system may take no action, as indicated at 806. Alternatively, if the system does detect a user intent to route the call audio to headset 102 (at 808 or 810), the system may execute a defined procedure to initiate an outbound call from Device C with the call audio routed to user HU's headset 102 outbound. As noted above, the procedure for initiating such call may be performed according to a cloud-based solution (starting at step 812), a mesh-based solution (starting at step 842), or a hybrid cloud/mesh solution (starting at step 880), e.g., based on the available system capabilities and configuration.

Turning first to the cloud-based solution, at 814 Device C may notify the cloud (e.g., server 114) that an outbound call is being initiated from Device C. At 816, server 114 may identify the user HU associated with Device C, e.g., based on stored device data 186. At 818, server 114 may identify a particular headset 102 for connecting to Device C and handling the call audio for the Device C outbound call, e.g., based on which headset 102 associated with the user HU (if multiple) is currently in use by the user (e.g., based on the donned/doffed status of each headset) and/or the user's headset preferences (if any), e.g., based on stored device data 186.

At 820, server 114 may identify, e.g., based on stored device data 186, which user devices 104 are currently connected (i.e., active connections) to the headset 102 identified at 212. In this example, server 114 determines Device A and Device B are currently connected to the headset 102. At 822, server 114 may select and designate a particular user device 104—in this example, Device A—as a "connection control device" for performing control/notification actions related to initiating the Device C outbound call (e.g., interacting with headset 102), e.g., as discussed above regarding step 216 of method 200.

Upon being designated as the connection control device, at 824 Device A may instruct other user devices, including Device B, to interrupt or suppress messaging between Device B and headset 102 during the initiation of the Device C outbound call or until a defined time-out is reached. At 826, which may be performed simultaneous with step 824, Device A takes action to first ensure that the user's current active audio stream on the headset 102 is handled appropriately, before instructing the headset 102 to break its connection with Device B. For example, if Device A has a currently active audio stream (e.g., voice call or streaming music) via headset 102, Device A may suspend, terminate, or otherwise interrupt such audio stream at 826. At 828, Device A may break the current connection between headset 102 and Device B, e.g., to free up a connection spot for Device C to connect to headset 102. For example, server 114 messages Device A to break the connection between headset 102 and Device B, Device A may then command headset 102 to break its connection with Device B, and headset 102 may then break the connection with Device B.

At 830, Device A and back-end server 114 may communicate to share relevant information, including (a) Device A updating server 144 with the current headset connection information stored in device data 186 (specifically, that headset is connected to Device A but no longer connected to B, such that server 144 can instruct headset 102 to connect to Device C to fill the open connection spot) and (b) server 114 providing Device A with any required telemetry data to proceed with the connection of Device C to headset 102, e.g., identification/address information for Device C. At 832, Device A instructs headset 102 to connect to Device C, e.g., based on Device C connection data 135 stored at headset 102 and/or headset connection data 157 stored at Device C. (Device A may also manage the pairing of headset 102 to Device C, if not already paired, and then manage the connection of the headset 102 to the paired Device C. At 834, headset 102 communicates with Device C (e.g., exchanging keys or other connection data 135 and/or 157) to connect Device C to headset 102, and headset 102 (or Device C) may notify server 114 of the completed connection, such that server 114 may update device date 186 accordingly. At 836 the outbound call audio is routed from Device C to headset 102.

Turning next to the mesh-based solution, at 842 Device C may identify the user HU associated with Device C. At 844, Device C initiates the process of identifying a "connection control device" capable of facilitating the initiation of a Device C outbound call with call audio routed to headset 102. In one embodiment, Device C may generate and send out a message to mesh network 402 that includes (a) information needed by a receiving device 104, 410 to determine whether that device 104, 410 can act as the connection control device, e.g., (i) information regarding the Device C outbound call and (ii) an identification of the intended user (callee); and (b) Device C identification information enabling the receiving device 104, 410 to message back to Device C (e.g., a unique identifier or other information identifying Device C). A first mesh network device 104, 410 receives and processes the message at 512.

A first mesh network device 104, 410 receives and processes the message at 846. This receiving device 104, 410 may then determine at 514 whether it can act as the connection control device, e.g., based on (a) whether the user HU is logged into or currently using the respective device 104, 410 and (b) whether the device 104, 410 has a connected headset. If the receiving device 104, 410 determines it is not capable of acting as the connection control device (e.g., if either requirement (a) or (b) analyzed at 848 is not met), the device 104, 410 then forwards the request to other mesh network device(s) in the mesh network 402 at 850, and the method may return to step 846 for processing by such other mesh network device(s). When a particular device 104, 410 determines at 848 that it can act as the connection control device to facilitate initiation of the Device C outbound call with audio routed to headset 102 (e.g., if both requirements (a) and (b) analyzed at 848 are met by the particular device 104, 410), the method proceeds to 852. In this example scenario, Device A determines it can act as the connection control device, and thus the method proceeds to 852 to begin control actions by Device A.

At 852, Device A notifies Device C, via mesh network messaging back-propagation, that headset 102 associated with user HU has been identified (by Device A) and that Device A is now taking further action (as the connection control device). This notification step may be important to avoid or handle a possible race condition; namely, in the event a second device 104, 410 also determines at 848 that it can act as the connection control device, and notifies Device C of such determination, Device C can inform the second device 104, 410 that Device A is already acting as the connection control device, such that the second device may yield to Device A.

At 854, Device A takes action to first ensure that the user's current active audio stream on the headset 102 is handled appropriately, before instructing the headset 102 to break its connection with Device B. For example, if Device A has a currently active audio stream (e.g., voice call or streaming music) via headset 102, Device A may suspend, terminate, or otherwise interrupt such audio stream at 854. At 856, Device A may break the current connection between headset 102 and Device B, e.g., to free up a connection spot for Device C to connect to headset 102. For example, Device A may send command(s) to headset 102 and/or Device B operable to break the connection between headset 102 and Device B. At 858, Device A may instruct headset 102 to connect to Device C.

At 860, headset 102 determines whether it can connect to Device C, e.g., if headset 102 is within wireless communication range of Device C. If so, headset 102 connects to Device C at 834 and the outbound call audio is routed from Device C to headset 102 at 836.

Alternatively, returning to 860, if headset 102 cannot connect to Device C (e.g., if headset 102 is out of wireless communication range from Device C), Device A may take alternative actions. For example, Device A may attempt to route the Device C inbound call to headset 102 via Device A, using mesh connections between Device C and Device A. First, at 862, Device A may instruct Device C, via mesh network messaging back-propagation, to attempt to relay the call audio to Device A via mesh network 402 (there may be one or more intermediate devices 104, 410 involved in the audio relay as an inherently aspect of mesh network 402). If the audio is able to be successfully relayed (as determined at 864), at 866 the Device C outbound call is initiated, with the call audio being relayed to Device A (via mesh network 402) and further relayed to headset 102 via the active connection between headset 102 and Device A. Alternatively, if the audio cannot be successfully relayed from Device C to Device A, Device A may notify the user HU (or instruct headset 102 or Device C to notify the user HU) of the failure to use the headset 102 for the call audio of the Device C outbound call.

Finally, turning to the hybrid cloud/mesh solution, at 880 Device C may identify the user HU associated with Device C, and notify the cloud (e.g., server 114) of the Device C outbound call being initiated. At 882, server 114 may identify a particular headset 102 for connecting to Device C and handling the call audio for the Device C outbound call, e.g., as discussed above regarding step 818. At 884, server 114 may identify, e.g., based on stored device data 186, which user devices 104 are currently connected to the headset 102 identified at 212, in this example Device A and Device B, e.g., as discussed above regarding step 820. At 886, server 114 sends messages to Device A and Device B to notify the user HU (a) that the user's intent is being handled (i.e., that the headset 102 is being connected to Device C for the outbound call) and (ii) that the headset 102 is about to be disconnected from one of its currently connected devices.

At 888, Device A and Device B manage a race condition to determine which device will act as the connection control device, e.g., for communications with headset 102 related to initiating the Device C outbound call with audio routed to the headset 102. For example, Device A and Device B may manage such race condition either (a) based on defined rules or logic, e.g., using the example rules set forth in table 300 shown in FIG. 3 or similar rules, or (b) based on the first device to complete the action, e.g., the first device that receives and completes the request from server 114.

In this example, Device A is determined to act as the connection control device. After designating Device A as the connection control device, the method continues to steps 854-868, which are described above with reference to the mesh-based implementation that starts at step 842.

FIGS. 9-17 show flowcharts of process flows 900, 1000, 1100, 1200, 1300, 1400, 1500, 1600, and 1700 for various alternative implementations for managing connections between a headset and multiple user devices (also referred to as "clients" or "mobile clients" in selected figures) to handle an inbound call coming in at a non-connected user device, according to example embodiments.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method for managing connections between a wireless headset and multiple user devices including (a) at least one connected user device having a connection with the wireless headset and (b) at least one non-connected user device not having a connection with the wireless headset, the method comprising:
    detecting an inbound call inbound at a particular user device of the multiple user devices at a time when the particular user device is a non-connected user device;
    in response to detecting the inbound call, automatically outputting a human-perceptible prompt regarding the inbound call;
    receiving user input in response to the human-perceptible prompt, the user input indicating an intent to answer the inbound call as a headset-supported call in which call audio is routed to the headset;
    in response to the user input indicating an intent to answer the inbound call as a headset-supported call:
        automatically breaking the connection between the wireless headset and a first connected user device of the multiple user devices; and
        automatically establishing a connection between the wireless headset and the particular user device, thereby establishing the particular user device as a connected user device;
    answering the inbound call at the particular user device; and
    routing call data between the particular user device and the wireless headset.

2. The method of claim 1, wherein automatically breaking the connection between the wireless headset and the first connected user device comprises interrupting, at least temporarily, communications between the wireless headset and the first connected user device.

3. The method of claim 1, wherein automatically breaking the connection between the wireless headset and the first connected user device comprises terminating the connection between the wireless headset and the first connected user device.

4. The method of claim 1, wherein the step of answering the inbound call at the particular user device is performed after the step of automatically establishing a connection between the wireless headset and the particular user device.

5. The method of claim 1, wherein the step of answering the inbound call at the particular user device is performed before the step of automatically establishing a connection between the wireless headset and the particular user device.

6. The method of claim 1, wherein the step of automatically outputting the human-perceptible prompt regarding the inbound call comprises outputting an audible, visual, or haptic notification via an output device of the first connected user device, the particular user device, or the wireless headset.

7. The method of claim 1, wherein the step of receiving user input indicating an intent to answer the inbound call as a headset-supported call comprises receiving a defined voice input or manual input at the first connected user device, the particular user device, or the wireless headset.

8. The method of claim 1, wherein the step of receiving user input indicating an intent to answer the inbound call as a headset-supported call comprises automatically detecting a donning of the wireless headset by a user.

9. The method of claim 1, further comprising selecting a second connected user device of the multiple user devices to act as a connection control device to facilitate the establishment of the connection between the wireless headset and the particular user device.

10. The method of claim 9, wherein the step of selecting the second connected user device to act as the connection control device comprises:
   accessing, by a remote server remote from the headset and multiple user device, device connection data identifying the at least one connected user device having a connection with the wireless headset; and
   selecting, by the remote server, the second user device from the at least one connected user device.

11. The method of claim 9, wherein the second connected user device facilitating the establishment of the connection between the wireless headset and the particular user device comprises:
   the second connected user device obtaining, from a remote server, information regarding the particular user device; and
   the second connected user device using the obtained information regarding the particular user device to instruct the headset to establish a connection with the particular user device.

12. The method of claim 9, further comprising the second connected user device suspending or terminating an active audio stream from the second connected user device to the headset prior to the establishment of the connection between the wireless headset and the particular user device.

13. The method of claim 1, further comprising, after detecting the inbound call, selecting a second connected user device of the multiple user devices to act as a connection control device to:
   output or cause the output of the human-perceptible prompt regarding the inbound call; and
   facilitate the establishment of the connection between the wireless headset and the particular user device.

14. The method of claim 9, wherein the second connected user device, acting as the connection control device, facilitates the breaking of the connection between the wireless headset and the first connected user device.

15. The method of claim 1, wherein:
   the wireless headset is connected to a local mesh network including a plurality of mesh network devices including (a) the at least one connected user device and (b) the particular user device; and
   the method further comprises selecting a connection control device from the plurality of mesh network devices to facilitate the establishment of the connection between the wireless headset and the particular user device.

16. The method of claim 15, wherein selecting the connection control device from the plurality of mesh network devices comprises:
   the particular user device sending a request message via the mesh network;
   at least one of the mesh network devices receiving the request message;
   determining, by each respective mesh network device that receives the request message, whether that respective mesh network device is suitable to act as the connection control device, wherein only connected user devices are suitable to act as the connection control device.

17. The method of claim 15, comprising:
   the connection control device, selected from the plurality of mesh network devices, outputting the human-perceptible prompt regarding the inbound call;
   in response to the user input indicating an intent to answer the inbound call as a headset-supported call, the connection control device notifying the particular user device to answer the inbound call; and
   the connection control device instructing the headset to establish a connection with the particular user device.

18. A method for managing connections between a wireless headset and multiple user devices including (a) at least one connected user device having a connection with the wireless headset and (b) at least one non-connected user device not having a connection with the wireless headset, the method comprising:
   causing an output of a human-perceptible prompt in response to a detection of an inbound call inbound at a particular user device at a time when the particular user device is a non-connected user device;
   receiving user input responsive to the human-perceptible prompt, the user input indicating an intent to answer the inbound call as a headset-supported call in which call audio is routed to the headset;
   in response to the user input indicating an intent to answer the inbound call as a headset-supported call:
      initiating a breaking of the connection between the wireless headset and a first connected user device of the multiple user devices; and
      initiating an establishment of a connection between the wireless headset and the particular user device, thereby establishing the particular user device as a connected user device; and
   causing the particular user device to answer the inbound call and route audio call data to the wireless headset for audible output via at least one speaker of the wireless headset.

19. A system for managing connections between a wireless headset and multiple user devices including (a) at least one connected user device having a connection with the wireless headset and (b) at least one non-connected user device not having a connection with the wireless headset, the system comprising:
   logic instructions stored in non-transitory computer readable media and executable by at least one processor to:
      cause an output of a human-perceptible prompt in response to a detection of an inbound call inbound at a particular user device at a time when the particular user device is a non-connected user device;
      receive user input responsive to the human-perceptible prompt, the user input indicating an intent to answer the inbound call as a headset-supported call in which call audio is routed to the headset;
      in response to the user input indicating an intent to answer the inbound call as a headset-supported call:
         initiate a breaking of the connection between the wireless headset and a first connected user device of the multiple user devices; and
         initiate an establishment of a connection between the wireless headset and the particular user device, thereby establishing the particular user device as a connected user device; and
      cause the particular user device to answer the inbound call and route audio call data to the wireless headset for audible output via at least one speaker of the wireless headset.

* * * * *